United States Patent
Gorokhov et al.

(10) Patent No.: US 8,116,800 B2
(45) Date of Patent: Feb. 14, 2012

(54) REVERSE LINK TRAFFIC POWER CONTROL FOR LBC FDD

(75) Inventors: Alexei Gorokhov, San Diego, CA (US); Mohammad J. Borran, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 989 days.

(21) Appl. No.: 11/947,517

(22) Filed: Nov. 29, 2007

(65) Prior Publication Data

US 2008/0153535 A1 Jun. 26, 2008

Related U.S. Application Data

(60) Provisional application No. 60/868,076, filed on Nov. 30, 2006.

(51) Int. Cl.
H04B 7/00 (2006.01)
H04Q 7/20 (2006.01)

(52) U.S. Cl. ..... 455/522; 455/69; 455/67.13; 455/127.1

(58) Field of Classification Search .......... 455/522, 455/69, 67.13, 452.1, 452.2, 63.1, 67.16, 455/127.1, 67.11, 126; 370/232, 311, 329
See application file for complete search history.

(56) References Cited

U.S. PATENT DOCUMENTS

| 7,126,917 B2 | 10/2006 | Harris et al. |
| 2003/0232622 A1 | 12/2003 | Seo et al. |
| 2005/0025077 A1 | 2/2005 | Balasubramanian et al. |
| 2006/0019694 A1* | 1/2006 | Sutivong et al. ............. 455/522 |
| 2006/0215559 A1* | 9/2006 | Mese et al. .................... 370/232 |

FOREIGN PATENT DOCUMENTS

| JP | 2005006288 A | 1/2005 |
| JP | 2005277676 A | 10/2005 |
| RU | 2198466 C2 | 2/2003 |
| WO | WO0048327 | 8/2000 |
| WO | 2006007318 | 1/2006 |
| WO | 2006094299 | 9/2006 |

OTHER PUBLICATIONS

International Search Report—PCT/US07/085945, International Search Authority—European Patent Office, Apr. 17, 2008.
Written Opinion—PCT/US2007/085945, International Search Authority, European Patent Office, Apr. 17, 2008.
Taiwan Search Report—TW096145758—TIPO—May 21, 2011.

* cited by examiner

Primary Examiner — John J Lee
(74) Attorney, Agent, or Firm — Donald C. Kordich

(57) ABSTRACT

Systems and methodologies are described that facilitate controlling reverse link power on a traffic channel. Assignments for reverse link communication can be yielded. Interference from mobile devices in neighboring sectors can be monitored and other sector interference (OSI) indications can be broadcasted. The OSI indications can be obtained by mobile devices to alter delta values employed for delta-based power control. Further, a maximum allowable amount of reduction of a delta value can be allocated per QoS class. Moreover, mobile devices can provide in-band and out-of-band feedback, which can be leveraged for future assignments.

65 Claims, 15 Drawing Sheets

REVERSE LINK TRAFFIC POWER CONTROL FOR LBC FDD

CROSS-REFERENCE TO RELATED APPLICATIONS

This application claims the benefit of U.S. Provisional Patent application Ser. No. 60/868,076 entitled "RL TRAFFIC POWER CONTROL FOR LBD FDD" which was filed Nov. 30, 2006. The entirety of the aforementioned application is herein incorporated by reference.

BACKGROUND

I. Field

The following description relates generally to wireless communications, and more particularly to employing delta-based reverse link traffic power control and interference management in a wireless communication system.

II. Background

Wireless networking systems have become a prevalent means by which a majority of people worldwide has come to communicate. Wireless communication devices have become smaller and more powerful in order to meet consumer needs and to improve portability and convenience. Consumers have become dependent upon wireless communication devices such as cellular telephones, personal digital assistants (PDAs) and the like, demanding reliable service, expanded areas of coverage and increased functionality.

Generally, a wireless multiple-access communication system can simultaneously support communication for multiple wireless terminals or mobile devices. Each mobile device communicates with one or more base stations via transmissions on the forward and reverse links. The forward link (or downlink) refers to the communication link from the base stations to the mobile devices, and the reverse link (or uplink) refers to the communication link from the mobile devices to the base stations.

Wireless systems can be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Typically, each base station supports mobile devices located within a specific coverage area referred to as a sector. A sector that supports a specific mobile device is referred to as the serving sector. Other sectors, not supporting the specific mobile device, are referred to as non-serving sectors. Mobile devices within a sector can be allocated specific resources to allow simultaneous support of multiple mobile devices. As such, mobile devices within a sector typically do not interfere with each other since they can be assigned orthogonal resources. However, transmissions by mobile devices in neighboring sectors may not be coordinated. Consequently, transmissions by mobile devices operating in neighboring sectors can cause interference and degradation of mobile device performance.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating control of reverse link power on a traffic channel. Assignments for reverse link communication can be yielded. Interference from mobile devices in neighboring sectors can be monitored and other sector interference (OSI) indications can be broadcasted. The OSI indications can be obtained by mobile devices to alter delta values employed for delta-based power control. Further, a maximum allowable amount of reduction of a delta value can be allocated per QoS class. Moreover, mobile devices can provide in-band and out-of-band feedback, which can be leveraged for future assignments.

According to related aspects, a method that facilitates controlling reverse link power in a wireless communication environment is described herein. The method can include assigning bounds for adjustment of a delta value based upon a quality of service (QoS) class. Further, the method can include transmitting a reverse link assignment to at least one served mobile device. Moreover, the method can comprise monitoring reverse link interference from mobile devices in neighboring sectors. The method can also include broadcasting an other sector interference (OSI) indication to adjust reverse link power levels of the mobile devices in neighboring sectors.

Another aspect relates to a wireless communications apparatus. The wireless communications apparatus can include a memory that retains instructions related to assigning bounds for adjustment of a delta value based upon a quality of service (QoS) class, sending a reverse link assignment to a served mobile device, measuring reverse link interference from mobile devices in neighboring sectors, and broadcasting an other sector interference (OSI) indication to alter reverse link power levels of the mobile devices in neighboring sectors. Further, the wireless communications apparatus can include a processor, coupled to the memory, configured to execute the instructions retained in the memory.

Yet another aspect relates to a wireless communications apparatus that enables controlling reverse link interference levels of mobile devices in a wireless communications environment. The wireless communications apparatus can include means for assigning a delta value adjustment boundary based upon a QoS class. Further, the wireless communications apparatus can comprise means for sending a reverse link assignment to at least one mobile device. Moreover, the wireless communications apparatus can include means for broadcasting an OSI indication to adjust reverse link power levels of neighboring mobile devices based upon monitored interference.

Still another aspect relates to a machine-readable medium having stored thereon machine-executable instructions for assigning a delta value adjustment boundary based upon a QoS class; sending a reverse link assignment to at least one mobile device; and broadcasting an OSI indication to adjust reverse link power levels of neighboring mobile devices based upon monitored interference.

In accordance with another aspect, an apparatus in a wireless communication system can include a processor, wherein the processor can be configured to assign bounds for adjustment of a delta value based upon a quality of service (QoS) class. Further, the processor can be configured to transfer a reverse link assignment to at least one served mobile device.

Moreover, the processor can be configured to monitor reverse link interference from mobile devices in neighboring sectors. The processor can additionally be configured to broadcast an other sector interference (OSI) indication to adjust reverse link power levels of the mobile devices in neighboring sectors.

According to other aspects, a method that that facilitates controlling reverse link power levels in a wireless communications environment is described herein. The method can include determining a delta adjustment range based upon a quality of service (QoS) dependent assigned value. Moreover, the method can include evaluating a delta value based upon an other sector interference (OSI) indication, the delta value being within the delta adjustment range. Further, the method can include setting a transmit power spectral density (PSD) based upon the delta value.

Yet another aspect relates to a wireless communications apparatus that can include a memory that retains instructions related to identifying a delta adjustment range based upon a quality of service (QoS) dependent assigned value, evaluating a delta value based upon an other sector interference (OSI) indication, the delta value being within the delta adjustment range, and setting a transmit power spectral density (PSD) based upon the delta value. Further, the wireless communications apparatus can comprise a processor, coupled to the memory, configured to execute the instructions retained in the memory.

Another aspect relates to a wireless communications apparatus that enables adjusting a power level employed for communicating via a reverse link in a wireless communications environment. The wireless communications apparatus can include means for establishing a delta value range based upon a QoS dependent assigned value. Further, the wireless communications apparatus can include means for evaluating an adjustment to a delta value, the adjustment being within the delta value range. Moreover, the wireless communications apparatus can comprise means for setting a power spectral density.

Still another aspect relates to a machine-readable medium having stored thereon machine-executable instructions for establishing a delta value range based upon a QoS dependent assigned value, evaluating an adjustment to a delta value, the adjustment being within the delta value range, and setting a power spectral density for reverse link transmission.

In accordance with another aspect, an apparatus in a wireless communication system can include a processor, wherein the processor can be configured to identify a delta adjustment range based upon a quality of service (QoS) dependent assigned value; analyze a delta value based upon an other sector interference (OSI) indication, the delta value being within the delta adjustment range; and allocate a transmit power spectral density (PSD) based upon the delta value.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
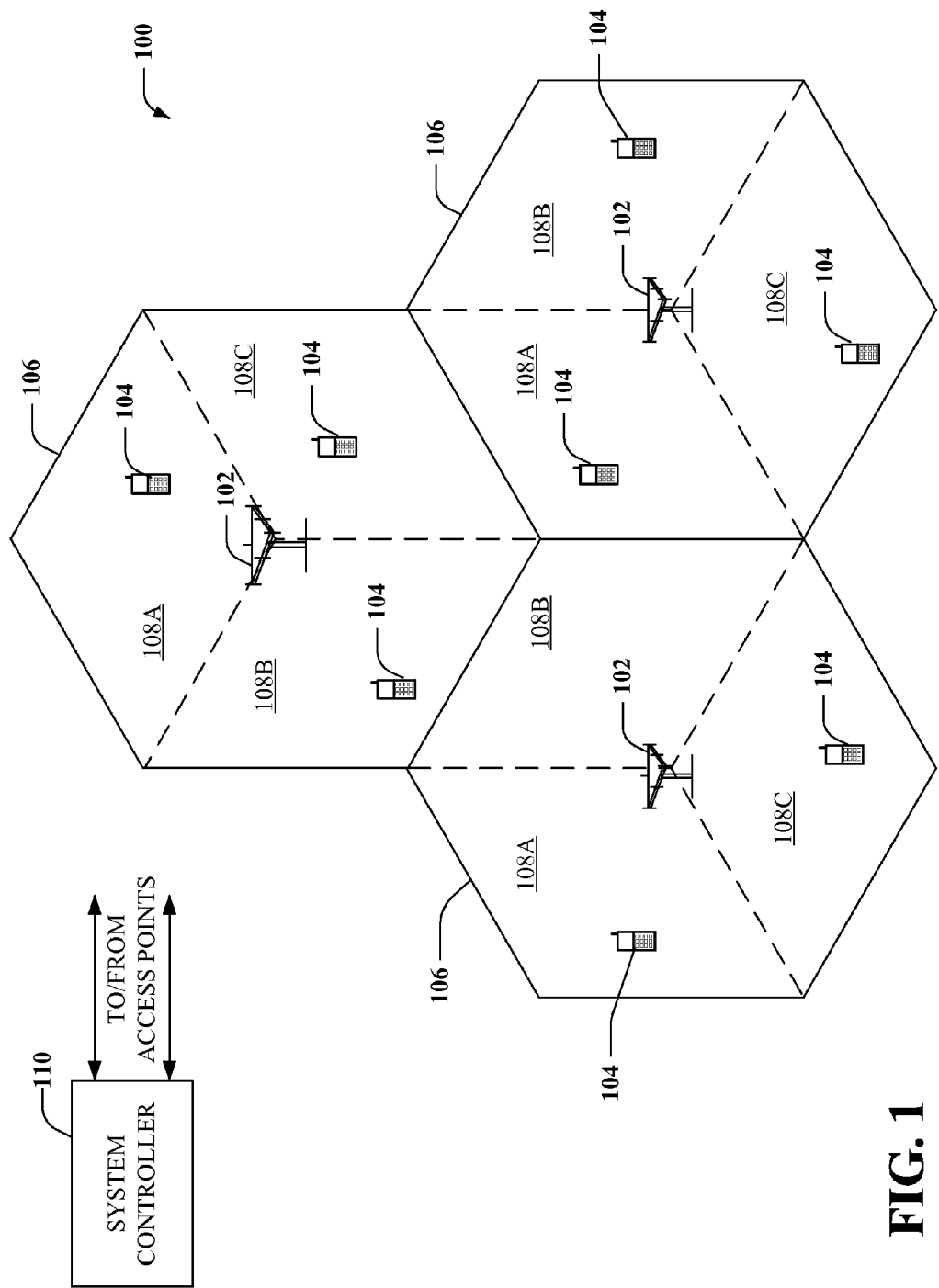
FIG. 1 is an illustration of an example wireless communication system in accordance with one or more aspects presented herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device (s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 in accordance with various aspects presented herein is illustrated. System 100 can comprise one or more base stations 102 that receive, transmit, repeat, etc., wireless communication signals to each other and/or to one or more mobile devices 104. Each base station 102 can comprise multiple transmitter chains and receiver chains, e.g., one for each transmit and receive antenna, each of which can in turn comprise a plurality of components associated with signal transmission and reception (e.g., processors, modulators, multiplexers, demodulators, demultiplexers, antennas, etc.). Mobile devices 104 can be, for example, cellular phones, smart phones, laptops, handheld communication devices, handheld computing devices, satellite radios, global positioning systems, PDAs, and/or any other suitable device for communicating over wireless system 100. In addition, each mobile device 104 can comprise one or more transmitter chains and receiver chains, such as used for a multiple input multiple output (MIMO) system. Each transmitter and receiver chain can comprise a plurality of components associated with signal transmission and reception (e.g., processors, modulators, multiplexers, demodulators, demultiplexers, antennas, etc.), as will be appreciated by one skilled in the art.

As illustrated in FIG. 1, each base station 102 provides communication coverage for a particular geographic area 106. The term "cell" can refer to a base station 102 and/or its coverage area 106, depending on context. To improve system capacity, a base station coverage area can be partitioned into multiple smaller areas (e.g., three smaller areas 108A, 108B and 108C). Although three smaller areas 108 are illustrated, it is contemplated that each geographic area 106 can be partitioned into any number of smaller areas 108. Each smaller area 108 is served by a respective base transceiver subsystem (BTS). The term "sector" can refer to a BTS and/or its coverage area depending upon context. For a sectorized cell, the base transceiver subsystem for all sectors of the cell is typically co-located within the base station for the cell.

Mobile devices 104 are typically dispersed throughout system 100. Each mobile device 104 can be fixed or mobile. Each mobile device 104 can communicate with one or more base stations 102 on the forward and reverse links at any given moment.

For a centralized architecture, a system controller 110 couples with base stations 102 and provides coordination and control of base stations 102. For a distributed architecture, base stations 102 can communicate with one another as needed. Communication between base stations 102 via system controller 110 or the like can be referred to as backhaul signaling.

The techniques described herein can be used for a system 100 with sectorized cells as well as a system with un-sectorized cells. For clarity, the following description is for a system with sectorized cells. The term "base station" is used generically for a fixed station that serves a sector as well as a fixed station that serves a cell. The terms "mobile device" and "user" are used interchangeably, and the terms "sector" and "base station" are also used interchangeably. A serving base station/sector is a base station/sector with which a mobile device has reverse link traffic transmissions. A neighbor base station/sector is a base station/sector with which a mobile device does not have reverse link traffic transmissions. For example, a base station only serving the forward link to a mobile device should be considered a neighbor sector for interference management purposes.

Figure 2:
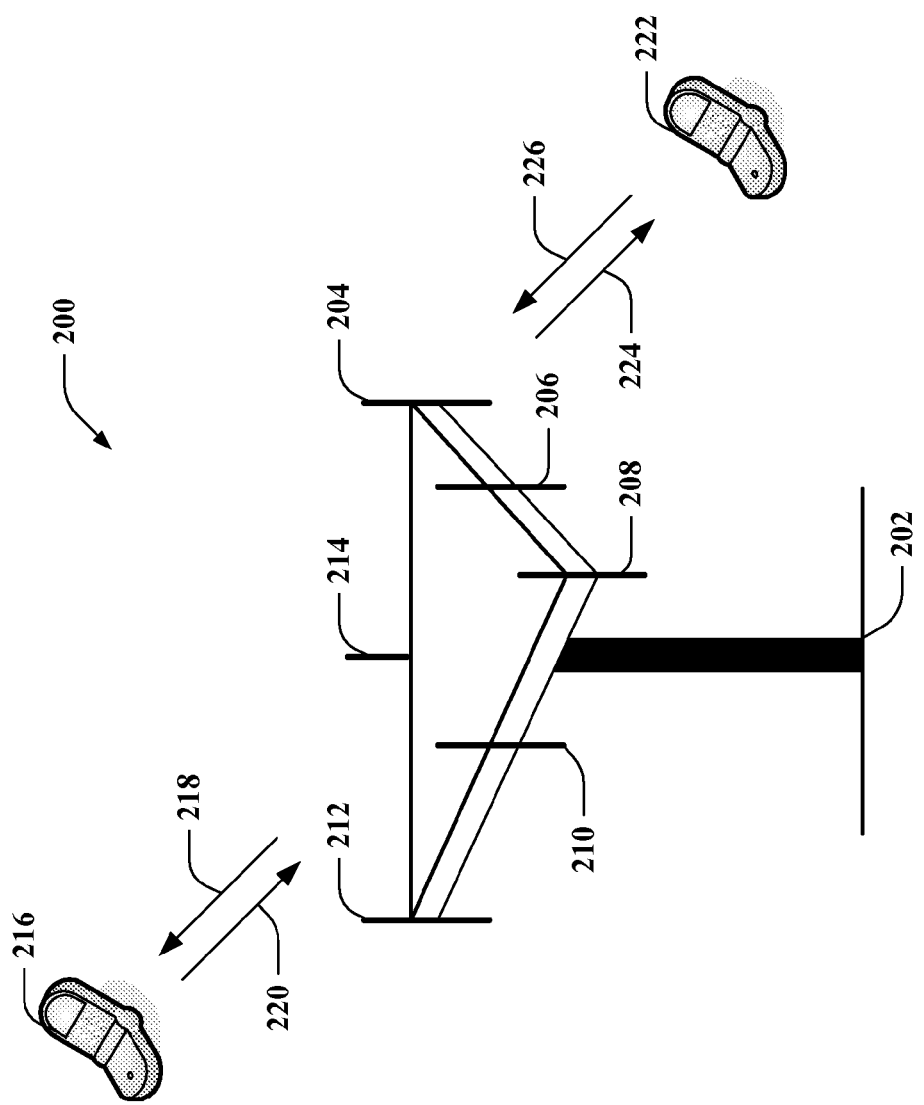
FIG. 2 is an illustration of an example wireless communication system in accordance with various aspects set forth herein.

Referring now to FIG. 2, a wireless communication system 200 is illustrated in accordance with various embodiments presented herein. System 200 comprises a base station 202 that can include multiple antenna groups. For example, one antenna group can include antennas 204 and 206, another group can comprise antennas 208 and 210, and an additional group can include antennas 212 and 214. Two antennas are illustrated for each antenna group; however, more or fewer antennas can be utilized for each group. Base station 202 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 202 can communicate with one or more mobile devices such as mobile device 216 and mobile device 222; however, it is to be appreciated that base station 202 can communicate with substantially any number of mobile devices similar to mobile devices 216 and 222. Mobile devices 216 and 222 can be, for example, cellular phones, smart phones, laptops, handheld communication devices, handheld computing devices, satellite radios, global positioning systems, PDAs, and/or any other suitable device for communicating over wireless communication system 200. As depicted, mobile device 216 is in communication with antennas 212 and 214, where antennas 212 and 214 transmit information to mobile device 216 over a forward link 218 and receive information from mobile device 216 over a reverse link 220. Moreover, mobile device 222 is in communication with antennas 204 and 206, where antennas 204 and 206 transmit information to mobile device 222 over a forward link 224 and receive information from mobile device 222 over a reverse link 226. In a frequency division duplex (FDD) system, forward link 218 can utilize a different frequency band than that used by reverse link 220, and forward link 224 can employ a different frequency band than that employed by reverse link 226, for example. Further, in a time division duplex (TDD) system, forward link 218 and reverse link 220 can utilize a common frequency band and forward link 224 and reverse link 226 can utilize a common frequency band.

The set of antennas and/or the area in which they are designated to communicate can be referred to as a sector of base station 202. For example, multiple antennas can be designed to communicate to mobile devices in a sector of the areas covered by base station 202. In communication over forward links 218 and 224, the transmitting antennas of base station 202 can utilize beamforming to improve signal-to-noise ratio of forward links 218 and 224 for mobile devices 216 and 222. Also, while base station 202 utilizes beamforming to transmit to mobile devices 216 and 222 scattered randomly through an associated coverage, mobile devices in neighboring cells can be subject to less interference as compared to a base station transmitting through a single antenna to all its mobile devices.

According to an example, system 200 can be a multiple-input multiple-output (MIMO) communication system. Further, system 200 can utilize any type of duplexing technique to divide communication channels (e.g., forward link, reverse link, . . . ) such as FDD, TDD, and the like. Moreover, system 200 can employ information broadcasts to effectuate dynamic power control for the reverse links. Pursuant to an illustration, base station 202 can transmit power control related information over forward links 218 and 224 to mobile devices 216 and 222. The power control related information can be included in a reverse link data channel assignment provided to the mobile devices 216 and 222. Base station 202 can broadcast other sector interference indications. For example, base station 202 can broadcast regular other sector interference values every superframe and fast other sector interference values for every subband on every reverse link frame. The other sector interference indications can be broadcasted to mobile devices (not shown) in other sectors not served by base station 202. Additionally, mobile devices 216 and 222 receive the broadcasted other sector interference values from base stations other than base station 202. Mobile devices 216 and 222 can also receive the power control related information included in the assignment from base station 202. Accordingly, mobile device 216 and 222 can employ the received other sector interference values and power control information to adjust power on a reverse link data channels. For example, mobile devices 216 and 222 can utilize fast other sector interference values to maintain and adjust transmit delta values employed to regulate power spectral density of the reverse link data channels. In addition, mobile devices 216 and 222 can employ regular other sector interference values to maintain and adjust slow delta values that can be communicated to base station 202 via reverse links 220 and 226, respectively. The slow delta values can be employed by base station 202 as suggested values for future assignments. As described herein, delta values can be in general per interlace (or frame) and per subband or subzone, where a subzone can be a subset of frequency resources.

Pursuant to another illustration, system 200 can be an OFDMA system. Accordingly, multiple traffic channels can be defined whereby each subband is used for only one traffic channel in any given time interval and each traffic channel can be assigned zero, one or multiple subbands in each time interval. The traffic channels can include data channels used to send traffic/packet data and control channels used to send overhead/control data. The traffic channels can also be referred to as physical channels, transport channels, or some other terminology.

The traffic channels for each sector can be defined to be orthogonal to one another in time and frequency so that no two traffic channels (e.g., associated with a common base station 202) use the same subband in any given time interval. This orthogonality avoids intra-sector interference among multiple transmissions sent simultaneously on multiple traffic channels in the same sector. Some loss of orthogonality can result from various effects such as, for example, inter-carrier interference (ICI) and inter-symbol interference (ISI). This loss of orthogonality results in intra-sector interference. The traffic channels for each sector can also be defined to be pseudo-random with respect to the traffic channels for nearby sectors. This randomizes the inter-sector or "other-sector" interference caused by traffic channels in one sector to traffic channels in nearby sectors. Randomized intra-sector interference and inter-sector interference can be achieved in various manners. For example, frequency hopping can provide randomized intra-sector and inter-sector interference as well as frequency diversity against deleterious path effects. With frequency hopping (FH), each traffic channel is associated with a specific FH sequence that indicates the particular subband(s) to use for the traffic channel in each time interval. The FH sequences for each sector can also be pseudo-random with respect to the FH sequences for nearby sectors. Interference between two traffic channels in two sectors can occur whenever these two traffic channels use the same subband in the same time interval. However, the inter-sector interference is randomized due to the pseudo-random nature of the FH sequences used for different sectors.

Data channels can be assigned to active mobile devices such that each data channel is used by only one mobile device at any given time. To conserve system resources, control channels can be shared among multiple mobile devices using, for example, code division multiplexing. If the data channels are orthogonally multiplexed only in frequency and time (and not code), then they may be less susceptible to loss in orthogonality due to channel conditions and receiver imperfections than the control channels.

The data channels thus can have several key characteristics that can be pertinent for power control. For instance, intra-cell interference on the data channels can be minimal because of the orthogonal multiplexing in frequency and time. Further, inter-cell interference can be randomized because nearby sectors use different FH sequences. The amount of inter-cell interference caused by a given mobile device can be determined by the transmit power level used by that mobile device and the location of the mobile device relative to the neighbor base stations.

For the data channels, power control can be performed such that each mobile device is allowed to transmit at a power level that is as high as possible while keeping intra-cell and inter-cell interference to within acceptable levels. A mobile device located closer to its serving base station can be allowed to transmit at a higher power level since this mobile device will likely cause less interference to neighbor base stations. Conversely, a mobile device located farther away from its serving base station and toward a sector edge can be allowed to transmit at a lower power level since this mobile device can cause more interference to neighbor base stations. Controlling transmit power in this manner can potentially reduce the total interference observed by each base station while allowing "qualified" mobile devices to achieve higher SNRs and thus higher data rates.

Power control for the data channels can be performed in various manners. The following provides an example of power control; it is to be appreciated that the claimed subject matter is not so limited. According to this example, the transmit power for a data channel for a given mobile device can be expressed as:

$$P_{dch}(n) = P_{ref}(n) + \Delta P(n) \qquad \text{Eq. (1)}$$

where $P_{dch}(n)$ is the transmit power for the data channel for update interval n, $P_{ref}(n)$ is a reference power level for update interval n, and $\Delta P(n)$ is a transmit power delta for update interval n. The power levels $P_{dch}(n)$ and $P_{ref}(n)$ and the transmit power delta $\Delta P(n)$ can be given in units of decibels. The transmit power delta, $\Delta P(n)$, can also be called the delta in this disclosure.

The mobile device can maintain a reference power level or power spectral density level, and can compute its transmit power or power spectral density on traffic channels by adding an appropriate offset value (e.g., which can be in dB) to the reference level. This offset is usually referred to as the delta value. The mobile device can maintain one delta value, two delta values, or more. The mobile device can limit the range of delta values. In cases where signal distortions caused by physical channel result in loss of orthogonality and hence intra-sector interference, the power control algorithm can also take into account requirements on the dynamic range of the received signal, and limit the maximum and minimum delta values. Such minimum ($\Delta_{min}$) and maximum ($\Delta_{max}$) delta values can, in turn, be adjusted based on information related to the interference level being broadcast from the serving sector of the mobile device.

The reference power level is the amount of transmit power needed to achieve a target signal quality for a designated transmission (e.g., on a control channel). Signal quality (e.g., denoted as SNR) can be quantified by a signal-to-noise ratio, a signal-to-noise-and-interference ratio, and so on. The reference power level and the target SNR can be adjusted by a power control mechanism to achieve a desired level of performance for the designated transmission, as described herein. If the reference power level can achieve the target SNR, then the received SNR for the data channel can be estimated as:

$$SNR_{dch}(n) = SNR_{target} + \Delta P(n) \qquad \text{Eq. (2)}$$

Equation (2) can assume that the data channel and the control channel have similar interference statistics. This is the case, for example, if the control and data channels from different sectors can interference with one another. The reference power level can be determined as described below.

The transmit power for the data channel can be set based on various factors such as, for instance, (1) the amount of inter-sector interference the mobile device can be causing to other mobile devices in neighbor sectors, (2) the amount of intra-sector interference the mobile device can be causing to other mobile devices in the same sector, (3) the maximum power level allowed for the mobile device, and (4) possibly other factors.

The amount of inter-sector interference each mobile device can cause can be determined in various manners. For example, the amount of inter-sector interference caused by each mobile device can be directly estimated by each neighbor base station and sent to the mobile device, which can then adjust its transmit power accordingly. This individualized interference reporting can require extensive overhead signaling. For simplicity, the amount of inter-sector interference each mobile device can cause can be roughly estimated based on the total interference observed by each neighbor base station, the channel gains for the serving and neighbor base stations, the transmit power level used by the mobile device, and the like.

Each base station can estimate the total or average amount of interference observed by that base station. This can be achieved by estimating the interference power on each subband and computing an average interference power based on the interference power estimates for the individual subbands. The average interference power can be obtained using various averaging techniques such as, for example, arithmetic averaging, geometric averaging, SNR-based averaging, and so on.

The subject disclosure further presents details on reverse link traffic channel power control for loosely backward compatible (LBC) frequency division duplexing (FDD). In certain aspects, a reserved value for $DataCtoI_{assigned}$ can be employed that instructs the mobile device to continue using the adjusted delta value from previous transmission(s) on a particular interlace.

According to a further illustration, a $DataCtoI_{min}$ value can be computed based on an offset with respect to the $DataCtoI_{assigned}$ value. The offset can be called MaxDeltaReduction. Moreover, this offset can be defined per QoS class. The mobile device can use the value corresponding to the lowest QoS class within a packet for the case of mixed flows. Pursuant to another example, the base station can use hybrid automatic repeat request (HARQ) extension to mitigate packet errors in case the offset is too large for a given packet and the packet does not terminate within a regular number of HARQ attempts.

Figure 3:
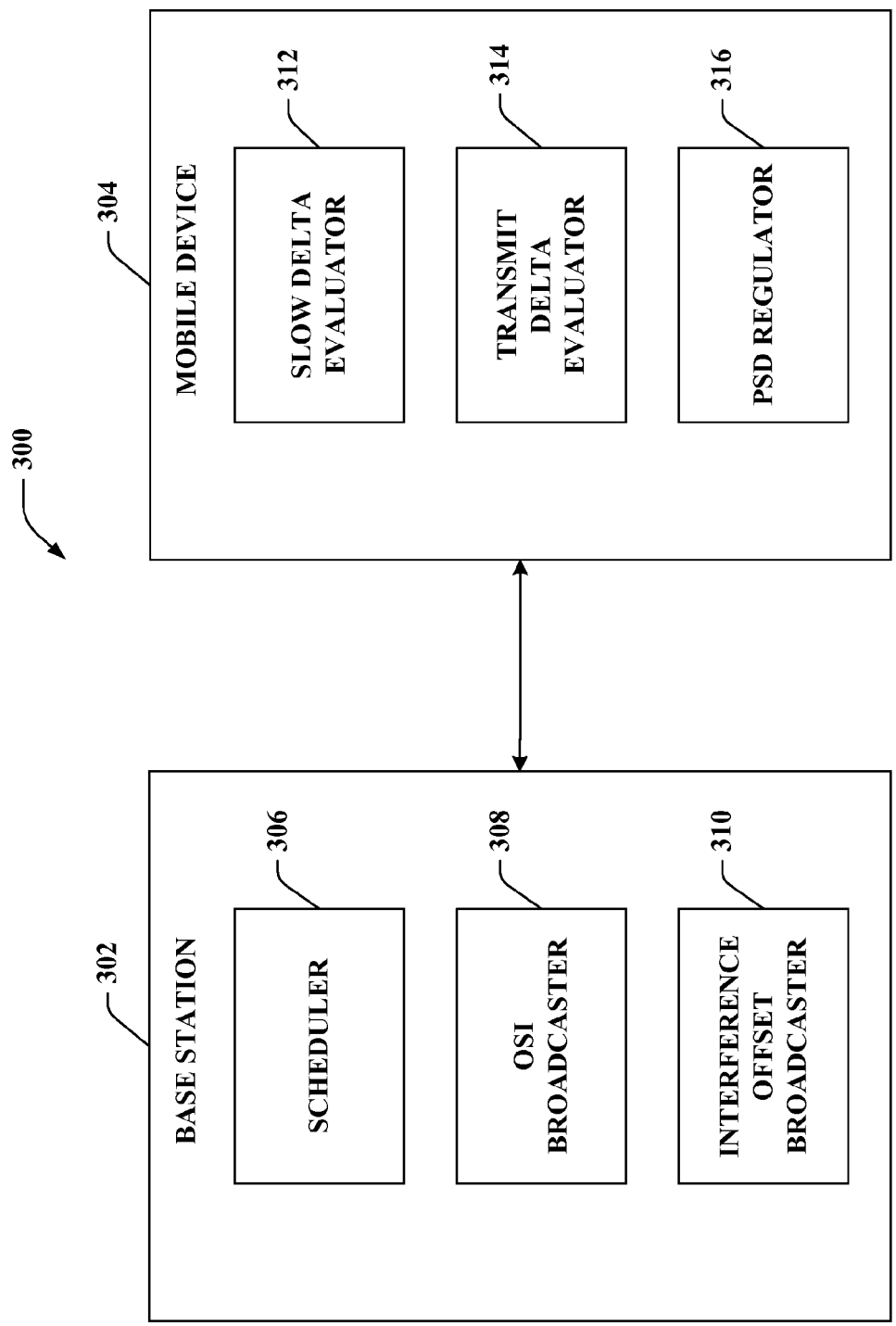
FIG. 3 is an illustration of an example wireless communications system that effectuates reverse link traffic power control according to an aspect of the subject disclosure.

Turning now to FIG. 3, illustrated is a wireless communications system 300 that effectuates reverse link transmit power control based upon considerations of broadcasted interference values, among other things. System 300 includes a base station 302 that communicates with a mobile device 304 (and/or any number of disparate mobile devices (not shown)). Base station 302 can transmit power control related information to mobile device 304 over a forward link channel and broadcast other sector interference values to mobile devices located in other sectors not served by base station 302. Further base station 302 can receive information from mobile device 304 (and/or any number of disparate mobile devices (not shown)) over a reverse link channel. Moreover, system 300 can be a MIMO system.

Base station 302 can include a scheduler 306, an other sector interference (OSI) broadcaster 308 and an interference offset broadcaster 310. Scheduler 306, among other things, provides a channel assignment to mobile device 304. The assignment can include a channel ID that specifies a set of hop ports via a channel tree. The assignment can also specify a packet format. The packet format can be the coding and/or modulation to be employed for transmissions on the assigned resources. Moreover, the assignment can include parameters that indicate the assignment is an extended transmission duration assignment and/or whether the assignment should replace or supplement an existing assignment. In accordance with an aspect of the subject disclosure, each packet format has an associated minimum carrier-to-interference (C/I) value for a data channel (hereinafter referred to as $DataCtoI_{min}$). The $DataCtoI_{min}$ value corresponds to the minimum C/I required to achieve a certain error rate at a particular hybrid automatic repeat request (HARQ) attempt. In addition, scheduler 306 conveys minimum and maximum carrier over thermal values for a data channel (hereinafter referred to as $DataCoT_{min}$ and $DataCoT_{max}$). These values can be included in the assignment issued by scheduler 306 of base station 302 to mobile device 304. Further, the assignment from scheduler 306 can include a C/I value for a data channel that is assigned to mobile device 304, DataCtoI$_{assigned}$. This value is selected based on a target HARQ termination. According to an aspect of the subject disclosure, a reserved value of DataCtoI$_{assigned}$ can be employed to instruct mobile devices to utilize its current delta value on the assignment interlace. Furthermore, scheduler 306 determines a maximum delta increase value (MaxDeltaIncrease) and a maximum delta reduction value (MaxDeltaReduction) per quality of service (QoS) class. While these aforementioned parameters (e.g., DataCtoI$_{min}$, DataCoT$_{min}$, DataCoT$_{max}$, DataCtoI$_{assigned}$, step sizes, . . . ) are assigned by base station 304, it is to be appreciated that the parameters need not be assigned through the same mechanisms or at the same time. For example, DataCoT$_{min}$, DataCoT$_{max}$, and step size can be semi-static parameters that need not be assigned for each packet or assignment. These parameters can be updated through upper layer messages or the like whenever an update is needed.

These values can be utilized by mobile device 304 in power control decisions. For example, the parameters can be employed to establish a range of transmit delta adjustments. The range can be specified in a plurality of ways. According to an aspect, explicit DataCtoI$_{min}$ and DataCtoI$_{max}$ values can be assigned and utilized to establish the range. In addition, relative bounds can be employed, for example, through parameters specifying maximum reduction or increase in the delta or C/I values. By way of illustration, a MaxDeltaIncrease and a MaxDeltaReduction parameter can be utilized. According to another illustration, a MaxCtoIIncrease value and a MaxCtoIReduction value can be employed. It is to be appreciated that combinations can also be possible (e.g., MaxDeltaIncrease and MaxCtoIReduction).

Scheduler 306 assigns resources (e.g., channels, frequencies, bandwidth, . . . ) to mobile device 304. Base station 302, employing scheduler 306, makes assignment decisions based upon various considerations. For example, the assignment decision can factor information received over the reverse request channel (R-REQCH). The request can include a buffer size or a quality of service (QoS) level. In addition, the scheduler 306 can base the assignment decision on other feedback information received from mobile device 304. Scheduler 306 can account for received feedback information such as a slow delta value that serves as a suggested value for future assignments. The feedback information can further include power amplifier headroom, an indication of fast OSI activity and the like.

Base station 302 further includes OSI broadcaster 308 that broadcasts other sector interference information to mobile devices in the other sectors not served by base station 302. Every superframe, base station 302 employs OSI broadcaster 308 to broadcast a regular OSI value to mobile devices. The regular OSI value represents an average interference observed during the previous superframe. It is to be appreciated that more than one previous superframe can be averaged. By way of example and not limitation, the regular OSI value can comprise the average interference observed during the previous three superframes. In accordance with an aspect, the regular OSI value can be broadcasted on a broadcast channel such as the forward link OSI pilot channel (F-OSICH). In addition, the regular OSI indication can be transmitted on the superframe preamble of every superframe. Delta-based power control by mobile device 304 based upon the regular OSI indications from base stations in other sectors can result in tight interference distributions in full-buffer scenarios.

In bursty traffic situations, more dynamic control of power levels can be required. Accordingly, OSI broadcaster 308 also broadcasts a fast OSI value received by mobile device 304 and other mobile devices served by base station 302. The fast OSI indication can be broadcasted over a fast OSI channel (F-FOSICH) on the forward link control segment. By way of example and not limitation, the fast OSI reports can be grouped in collections of four bits each and each collection can be transmitted utilizing six modulation symbols similar to data transmission over the forward pilot quality indicator channel (F-PQICH). In this example, erasure can be mapped to the all zero sequence such that there is no fast OSI indication on any of the involved subbands. The fast OSI value can be broadcasted for every subband on each interlace of every reverse link frame. The fast OSI value can be based upon interference observed over a particular subband on a certain reverse link frame.

Base station 302 further includes interference offset broadcaster 310. To reduce packet errors in the event of large interference over thermal (IoT) rise due to bursty traffic in the neighboring sectors, base station 302, via interference offset broadcaster 310, can employ fast IoT reports. Base station 302 can further employ scheduler 306 to facilitate dynamic adjustments of the minimum allowed delta value for each assignment as described infra. Interference offset broadcaster transmits an interference offset value, InterferenceOffset$_s$, for every subband, s. This value is based at least in part upon an amount of interference observed by base station 302 on subband s filtered across interlaces. This value can be transmitted over the forward interference over thermal channel (F-IOTCH).

In addition to the above described reports, base station 302 can further transmit quantized information about received control pilot carrier-over-thermal (CoT) power spectral density (PSD) for mobile device 304, if active, and for all active mobile devices in the sector served by base station 302. This information can be transmitted over F-PQICH. This information and the above described values can be employed by mobile device 304 in performing delta-based power control. According to an aspect of the subject disclosure, mobile device 304 maintains and adjusts a slow delta value and a transmit delta value.

A delta value is an offset between a PSD of a control pilot and a traffic PSD. The delta value is related to a received C/I value (e.g., DataCtoI) through a control pilot carrier-over-thermal PSD (pCoT) and a traffic interference-over-thermal PSD (IoT). For example, a delta value can be mapped to a data C/I value according to the following:

$$\Delta = CoT_{data} - CoT_{control}$$

$$\Delta = CoI_{data} + IoT_{data} - CoT_{control}$$

Pursuant to this illustration, CoT$_{data}$ is a carrier-over-thermal value of a data or traffic channel. The value, CoT$_{control}$, is a carrier-over-thermal value for a control channel such as the pilot channel PSD value (pCoT) received from a base station. Accordingly, the delta value, $\Delta$, is the difference or offset between the control and the traffic PSD values. CoT$_{data}$ is equivalent to the sum of the C/I value for the data channel, CoI$_{data}$, and the interference-over-thermal value for the data channel, IoT$_{data}$. CoI$_{data}$ can be the DataCtoI value assigned to a mobile device by a base station as described supra. In addition, IoT$_{data}$ can be the interference offset value transmitted by the base station.

Figure 4:
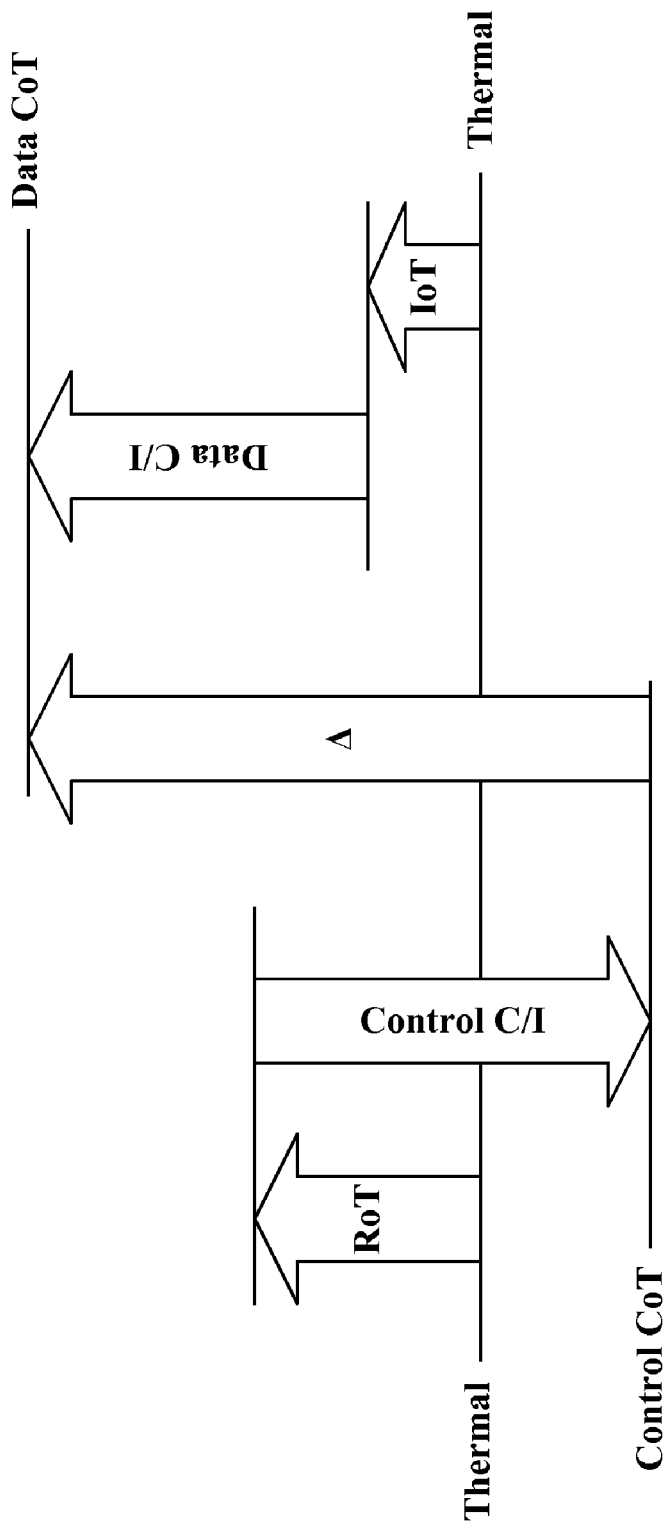
FIG. 4 is an illustration of an example mapping between a delta value, Δ, and data C/I.

Turning to FIG. 4, illustrated is an example mapping between a delta value, $\Delta$, and data C/I. The delta value, $\Delta$, can be an offset between the control CoT (CoT$_{control}$) and the data CoT (CoT$_{data}$). Further, according to an illustration, CoT$_{control}$ and/or IoT$_{data}$ can be fed back from a serving base station to a mobile device.

Referring again to FIG. 3, mobile device 304 maintains and adjusts delta values in accordance with a delta value range. The delta value range is established by mobile device 304 based upon broadcasted information received or information included in the assignment from base station 302. For example, mobile device 304 sets a minimum slow delta value, $\Delta_{slow,min}$, and a maximum slow delta value, $\Delta_{slow,max}$, based upon the following:

$$\Delta_{slow,min} = \text{DataCoT}_{min} - \text{pCoT}_{RLSS}$$

$$\Delta_{slow,max} = \text{DataCoT}_{max} - \text{pCoT}_{RLSS}$$

The values $\text{DataCoT}_{min}$ and $\text{DataCoT}_{max}$ are minimum and maximum, respectively, carrier-over-thermal PSD values for a traffic channel provided by base station 302 as part of the assignment. The value $\text{pCoT}_{RLSS}$ is the carrier-over-thermal PSD value for a pilot channel of the reverse link serving sector. Thus, mobile device 304 sets a slow delta value range based upon indications broadcasted or assigned by base station 302.

Mobile device 304 includes a slow delta evaluator 312 that maintains and adjusts a slow delta value, $\Delta_{slow}$. Slow delta evaluator 312 determines and adjusts the slow delta value based upon the regular OSI indications broadcasted by an other sector base station similar to base station 302. At every superframe, slow delta evaluator 312 generates an OSI monitor set. The OSI monitor set is formed by applying a threshold value to forward link geometries of sectors mobile device 304 can acquire. Additionally, the OSI monitor set can be formed by applying a threshold value to chandiff values of other sectors. It is to be appreciated that a separate monitor set can be generated for other sector base stations broadcasting fast OSI indications. The fast OSI monitor set can be restricted to members of the active set of mobile device 304. The sector comprising the reverse link serving sector of mobile device 304 is not include in the OSI monitor set. The OSI monitor set includes sectors that can be affected by interference caused by mobile device 304. For each member of the OSI monitor set, slow delta evaluator 312 computes chandiff values. The chandiff values are based upon received power on an acquisition pilot while taking into account the transmit power of each sector in the monitor set. Slow delta evaluator 312 adjusts the slow delta value based in part on the regular OSI values broadcasted from members of the OSI monitor set. Slow delta evaluator 312 further considers the corresponding chandiff values computed as well as the current slow delta value of mobile device 304. The slow delta value is adjusted with the constraint the value does not fall below the minimum value nor exceeds the maximum value. Mobile device 304 communicates the adjusted slow delta value to base station 302, the reverse link serving base station. The communicated value is employed as a suggested value for future assignments by base station 302.

Mobile device 304 further includes transmit delta evaluator 314 that maintains and adjusts a transmit delta value, $\Delta_{tx}$. Transmit delta evaluator 314 determines and alters the transmit delta value based upon the fast OSI indications broadcasted by an other sector base station similar to base station 302. The adjustment can be per subband when the fast OSI indications are also per subband. After assignment on subband, s, with an explicit $\text{DataCtoI}_{assigned}$ provided by scheduler 306 of base station 302, transmit delta evaluator 314 establishes a range for the transmit delta value. For each packet (or sub-packet), p, to be transmitted on subband s, transmit delta evaluator 314 establishes a minimum delta value, $\Delta_{min,p}$, and an assigned or maximum delta value, $\Delta_{max,p}$, according to the following:

$$\Delta_{min,p} = \text{InterferenceOffset}_{RLSS,s} - \text{pCoT}_{RLSS} + \text{DataCtoI}_{min,p}$$

$$\Delta_{max,p} = \text{InterferenceOffset}_{RLSS,s} - \text{pCoT}_{RLSS} + \text{DataCtoI}_{assigned,p}$$

Pursuant to this illustration, the value, $\text{InterferenceOffset}_{RLSS,s}$, is an indication of the interference over thermal level for subband s in the reverse link serving sector. This value is broadcasted by base station 302 and received by mobile device 304. The value, $\text{pCoT}_{RLSS}$, is the pilot CoT PSD in the reverse link serving sector for mobile device 304. The value, $\text{DataCtoI}_{min,p}$, is the minimum C/I value corresponding to packet, p. Mobile device 304 receives the value, $\text{DataCtoI}_{assigned,p}$, in the assignment from scheduler 306 in base station 302. Transmit delta evaluator 314 utilizes the most recent (e.g., un-erased) values of InterferenceOffset and pCoT. Further, a default sector-specific interference over thermal value can be utilized by transmit delta evaluator 314 if the channel conveying the interference offset is erased for a number of report intervals.

After establishing the range for transmit delta value, $\Delta_{tx}$, transmit delta evaluator 314 adjusts the value based upon the fast OSI indications broadcasted by neighboring sectors and received by mobile device 304. Initially, the transmit delta value is initialized to $\Delta_{max}$, as evaluated supra. After initialization, the transmit delta value is adjusted by stepping the value up or down based upon consideration of the broadcasted fast OSI indications. For a retransmission on interlace, i, transmit delta evaluator 314 adjusts the transmit delta value in response to fast OSI indications corresponding to the previous transmission on that interlace. The adjustment can be effectuated according to the following:

$$\Delta_{tx} = \begin{cases} \Delta_{tx} + fastOSIStepUp & \text{if all } fastOSI_i = 0 \\ \Delta_{tx} - fastOSIStepDown & \text{if any } fastOSI_i = 1 \end{cases}$$

Pursuant to this example, the value, $fastOSI_i$, is the fast OSI indications received corresponding to interlace i. The values, fastOSIStepUp and fastOSIStepDown, are a transmit delta value step up size and step down size respectively. The adjustment is made by transmit delta evaluator 314 with the constraint that the transmit delta value does not exceed $\Delta_{max}$ and does not fall below $\Delta_{min}$. For new packets or for new assignments not including any explicit $\text{DataCtoI}_{assigned}$, value, the transmit delta value is not initialized to $\Delta_{max}$. Rather, transmit delta evaluator 314 utilizes the most recent transmit delta value and performs the same adjustments as described above.

According to another aspect of the subject disclosure, mobile device 304 includes PSD regulator 316 that sets the transmit PSD of an assigned reverse link data channel (e.g., R-DCH) for every assignment. It is to be appreciated that the transmit PSD can be set every subband when the transmit delta value and fast OSI indications are per subband. The transmit PSD for the data channel is established in accordance with the following:

$$\text{PSD}_{R\text{-}DCH} = \text{PSD}_{R\text{-}PICH} + \Delta_{tx} + \text{AttemptBoost}_j$$

Pursuant to an illustration, j is the sub packet index, and the boost values, $\text{AttemptBoost}_j$, are assigned by base station 302. The value, $\text{PSD}_{R\text{-}PICH}$, is the PSD of the reverse link pilot channel. If the resultant transmit power is larger than the maximum transmit power available for traffic, PSD regulator 316 scales the data PSD such that the total transmit power is the maximum transmit power.

Further, in accordance with another aspect of the subject disclosure, mobile device 304 provides feedback to base station 302. Mobile device 304 can communicated out-of-band reports and in-band reports. Out-of-band reports can include information related to carrier-over-thermal values or chandiff values. For example, mobile device 304 can communicate a maximum achievable receive CoT value over the entire band. The CoT value can be an indication of PA headroom. This value can be calculated utilizing the pilot CoT feedback received on the pilot quality indicator channel of the forward link. According to an example, this value is only transmitted after substantial change from the previous report. In addition, mobile device 304 can report a chandiff value to base station 302. Similar to the reported CoT value, this value can only be reported after a substantial change.

In addition to an in-band request, mobile device 304 can report power control related information in-band. For example, mobile device 304 can report (e.g., using optional MAC header fields) a power amplifier headroom value, a slow delta value or a transmit delta value corresponding to the most recent adjusted value. The slow delta value can be a suggested value for future assignments and/or the transmit delta value can be a recent (e.g., most recent) value on a corresponding interlace (e.g., the value used for the first transmission of the packet). Additionally, mobile device 304 can report a projected $P_{max}$, which can be a maximum allowed transmit power based on a projected interference. Similar to the out-of-band reports, these reports can be transmitted after a significant change with respect to the previous report.

Figure 5:
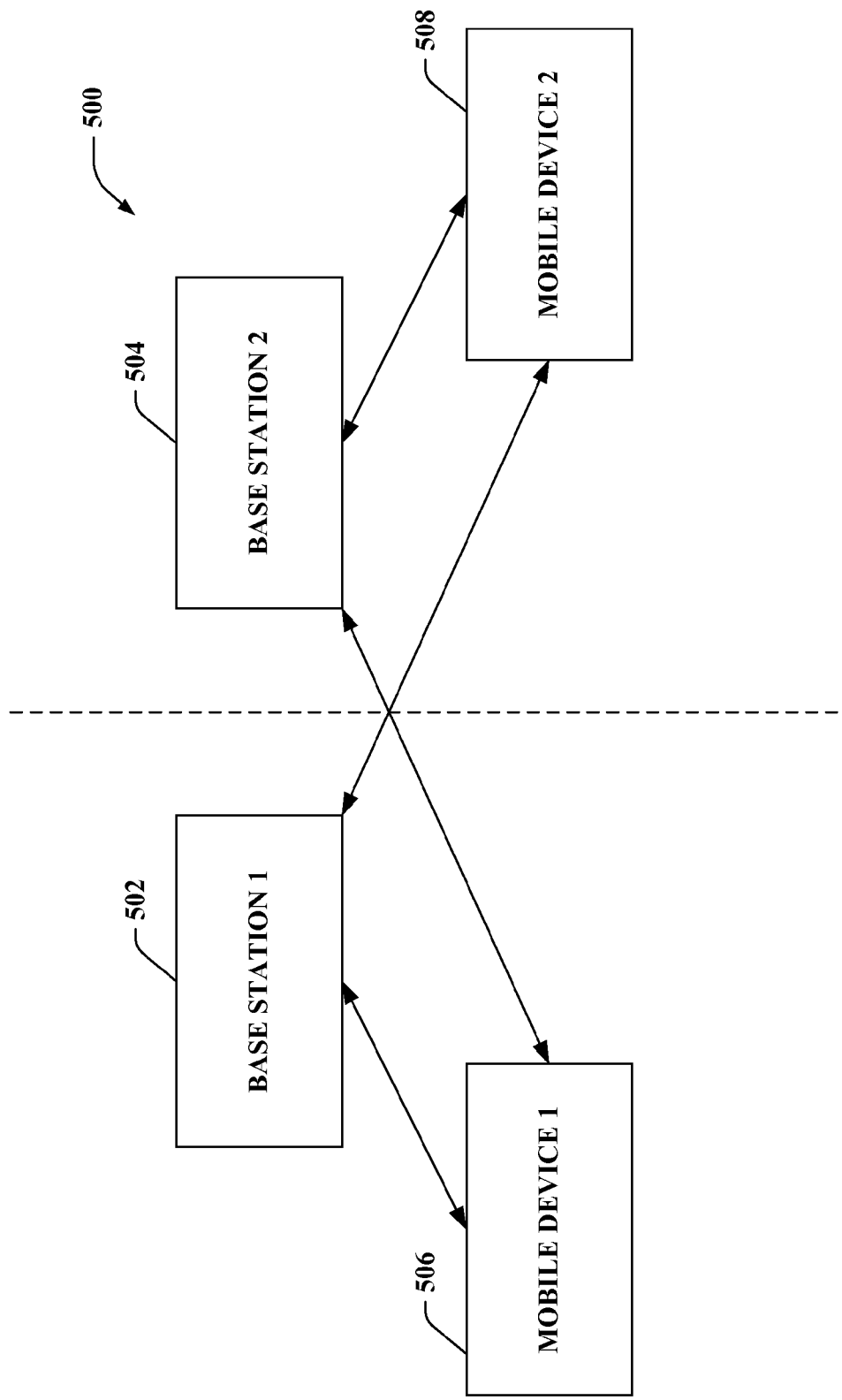
FIG. 5 is an illustration of an example system that provides reverse link power control and interference management.

Turning to FIG. 5, illustrated is an example system 500 that provides reverse link power control and interference management. System 500 includes a base station 1 502 and a base station 2 504; however, it is contemplated that system 500 can include any number of base stations. Base station 502 can serve a mobile device 1 506 (and/or any number of additional mobile devices (not shown)) and base station 504 can serve a mobile device 2 508 (and/or any number of additional mobile devices (not shown)).

Moreover, reverse link transmissions of mobile device 1 506 can interfere with reverse link transmissions of mobile device 2 508 (and vice versa); thus, base station 1 502 can obtain the signal communicated from mobile device 1 506 along with interference from mobile devices in neighboring sectors or cells (e.g., interference from mobile device 2 508). Accordingly, base station 1 502 can measure an amount of interference seen utilizing various metrics (e.g., average interference, . . . ). If base station 1 502 determines that the amount of interference is excessive, then base station 1 502 can transmit an OSI indication (e.g., regular OSI indication, fast OSI indication, . . . ) on the forward link in a broadcast fashion, which can notify neighboring mobile devices (e.g., mobile device 2 508) that they are causing too much interference to base station 1 502 and that the amount of power utilized by these neighboring mobile devices on the reverse link should be decreased.

Mobile devices 506-508 can adjust the transmit power levels based upon the OSI indications received from the non-serving base stations 502-504. For instance, adjustments can be in the form of changing the power spectral density of the transmissions. Mobile devices 506-508 can have a closed loop power control from the respective serving base stations 502-504, whereby the respective serving base stations 502-504 can control a reference power level for each mobile device 506-508 it is serving. Moreover, actual traffic transmissions can occur at an offset, A, with respect to such reference power level. Further, A can be adjusted based on the OSI indications. By way of illustration, if mobile device 1 506 receives an OSI indication (e.g., from base station 2 504), a delta value can be decreased which can yield a lowered transmit power to be utilized by mobile device 1 506.

Regular OSI indications can be sent by base stations 502-504 once every superframe (e.g., about every 25 milliseconds). Further, the regular OSI indications can yield small step size adjustments. Fast OSI indications can be transferred by base stations 502-504 every frame (e.g., about every 1 millisecond). The step size of the adjustments associated with fast OSI indications can be larger than the step size associated with the regular OSI indications. Moreover, the regular OSI indications can target mobile devices located in neighboring sectors as well as sectors positioned at farther distances, while the fast OSI indications can be aimed at mobile devices in more immediate neighboring sectors.

Utilization of OSI indications can result in packet losses and errors. If a mobile device (e.g., mobile device 506, mobile device 508, . . . ) reduces its transmit power in response to an OSI indication, it can jeopardize its own transmission due to employing the lower transmit power. For instance, each mobile device can have a certain assignment (e.g., modulation, coding rate, . . . ), and if the transmit power is lowered, the mobile device may not be able to successfully complete transmission and the base station may not be able to decode the packet. Accordingly, to maintain minimum performance levels (e.g., minimum latency in terms of HARQ transmissions to guarantee termination at a certain HARQ point), bounds can be placed upon the adjustments yielded in response to OSI indications.

For instance, base stations 502-504 can assign MaxDeltaReduction values. Assignments for MaxDeltaReduction values can be per QoS class; thus, each QoS class can be associated with its own MaxDeltaReduction value. The MaxDeltaReduction value can be a maximum amount that a mobile device is allowed to reduce its delta value in response to OSI indications. Further, each QoS class can have different latency requirements, which can result in differing MaxDeltaReduction values (e.g., a QoS class with a relaxed latency requirement can be associated with a large MaxDeltaReduction value that allows large reductions in delta in response to OSI indications). Utilizing the MaxDeltaReduction value can reduce overhead since this can be a semi-static parameter dependent upon QoS rather than being assigned per packet or the like (e.g., a minimum value for DataCtoI need not be explicitly assigned). Moreover, $DataCtoI_{min}=DataCtoI_{assigned}-MaxDeltaReduction$. Thus, the MaxDeltaReduction value and the $DataCtoI_{assigned}$ value can be used together to determine the range of $\Delta_{tx}$. Further, base stations 502-504 can use the value corresponding to a lowest QoS class within a packet for mixed flows. Accordingly, if a mobile device mixes differing QoS classes, parameters corresponding to the lowest QoS class in the mixed packet can be employed (e.g., to promote fairness). Additionally, a base station can assign a $DataCoT_{min}$ value and a $DataCoT_{max}$ value for a mobile device to be utilized to determine the range of $\Delta_{slow}$.

Moreover, base stations 502-504 can send assignments to mobile devices 506-508 (e.g., base station 1 502 can send an assignment to mobile device 1 506, base station 2 504 can send an assignment to mobile device 2 508, . . . ), where such assignments can include a $DataCtoI_{assigned}$. $DataCtoI_{assigned}$ can be selected based on a target HARQ termination. Further, there can be a reserved value to instruct the mobile device to use its current delta value on the assignment interlace; thus, an assignment can explicitly assign a DataCtoI value to a user or the user can be instructed to use a previous value on the interlace for a new transmission based upon the reserved value.

According to a further illustration, HARQ can be extended. For instance, HARQ can initially employ six transmissions; however, the claimed subject matter is not so limited. Upon a serving base station recognizing that a packet cannot be decoded at the 6$^{th}$ transmission, such base station can send a message that extends the number of HARQ retransmissions for the packet to mitigate packet loss. By way of further illustration, HARQ extension can be employed in combination with the attempt boost described above; however, it is also contemplated that HARQ extension can be utilized without the attempt boost.

Moreover, assignment decisions by base stations 502-504 can be based on feedback from respective mobile devices 506-508 as well as buffer size, QoS level, and the like. Feedback channels can be in-band or out-of-band. In-band channels can be part of the MAC header or trailer, while out-of-band channels can have a dedicated physical layer channel. Feedback information can include $\Delta_{tx}$ reports and $\Delta_{slow}$ reports (which can serve as suggest values for future assignments), PA headroom and projected $P_{max}$ (e.g., maximum allowed transmit power based on projected interference), and Chandiff for initial open loop projection.

Various channels can be employed to provide feedback from mobile devices 506-508 to respective serving base stations 502-504. For example, a reverse link PA headroom channel (R-PAHCH) and/or a reverse link PSD channel (R-PSDCH) can be utilized. R-PAHCH can employ 6 bits and can carry a maximum achievable receive CoT value over the entire band, which can be computed using pilot CoT feedback on F-PQICH. Further, R-PSDCH can be 4 bits and can carry information about a suggested PSD value for new assignments. R-PAHCH and/or R-PSDCH can be transmitted when there is a substantial change from the previous report, where there can be a constraint on the minimum change. Moreover, there can be a constraint on the maximum number of reports per a certain number of slots for R-PAHCH and/or R-PSDCH.

Mobile devices 506-508 can also report power control related information in-band. Mobile devices 506-508 can use optional MAC header and/or trailer fields to carry in-band information. The information reported in-band can related to PA headroom, projected $P_{max}$, $\Delta_{tx}$ (e.g., most recent value on the corresponding interlace, value used for the first transmission of the packet, . . . ) and $\Delta_{slow}$, and so forth.

Referring to FIGS. 6-10, methodologies relating to reverse link power adjustment based upon broadcasted interference information are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Figure 6:
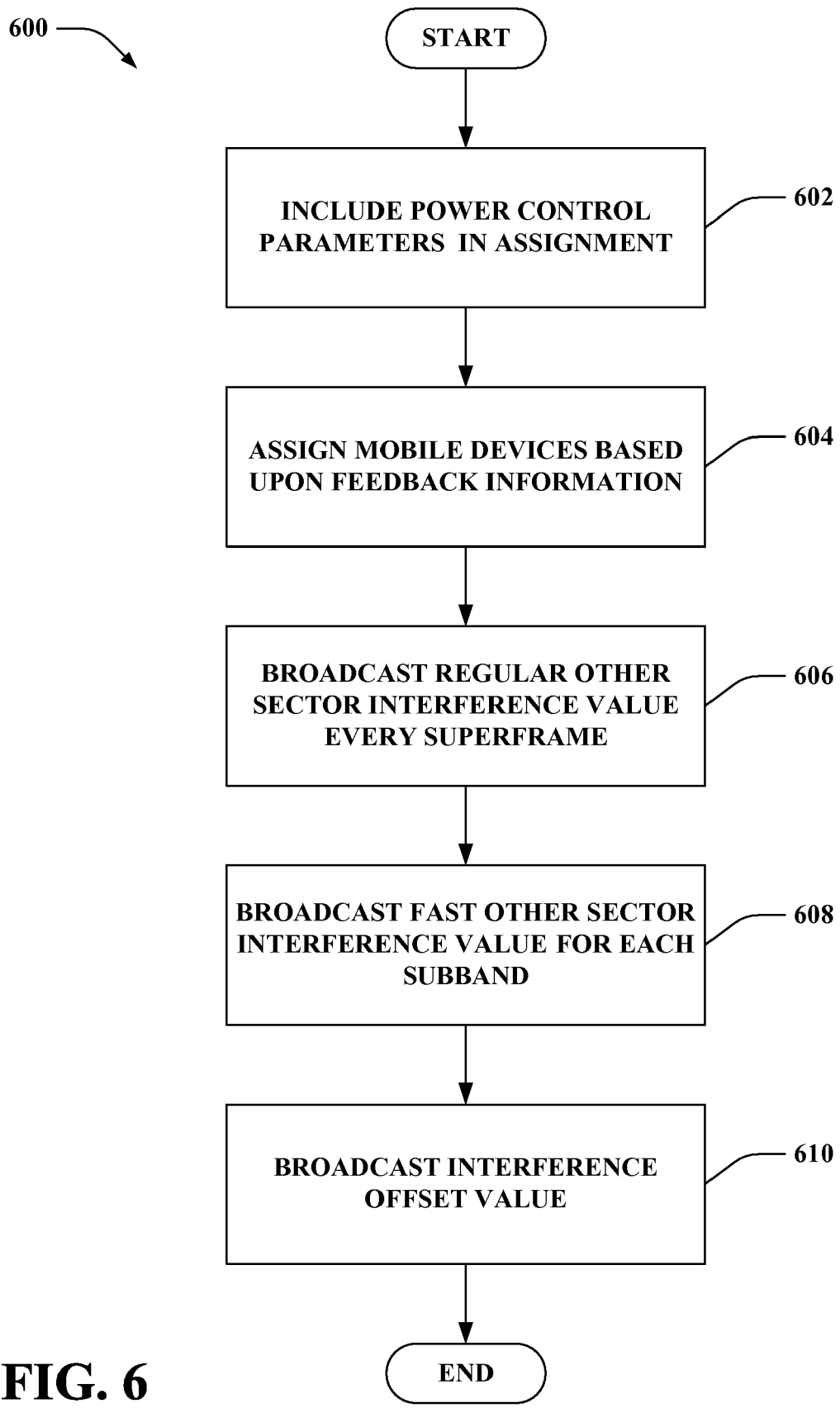
FIG. 6 is an illustration of an example methodology that facilitates reveres link transmit power control.

Turning now to FIG. 6, illustrated is a methodology 600 that facilitates reveres link transmit power control. In accordance with an aspect of the subject disclosure, methodology 600 can be carried out by a base station. Method 600 can be employed to provide mobile devices with parameters relevant in power control decisions, among other things. At 602, power control parameters are included in an assignment. An assignment, for example, can be an allocation of frequency resources or a designation of a reverse link data channel to a particular mobile device. The power control parameters can include a minimum and maximum carrier-over-thermal value for the reverse link data channel. In addition, the power control parameters can include an assigned or target C/I value relevant to a particular subband to which a mobile device is to be assigned. The power control parameters may not be included in every assignment as semi-static parameters and can only be assigned when the parameters require updating. At 604, mobile devices are assigned. The assignment decisions can be based in part on feedback information received from mobile devices. The feedback information can include delta values (e.g., slow delta values and transmit delta values), power amplifier headroom, a buffer size, a QoS level, maximum allowed power based upon projected interference and/or a report of excessive fast OSI activity.

At 606, a regular OSI indication is broadcasted. The broadcast can occur once every superframe and the indication can be included in the superframe preamble. The regular OSI indication is an average interference observed during the previous superframe(s). This value facilitates determining a slow delta value. At 608, a fast OSI indication is broadcasted. The broadcast can occur for every subband on every reverse link frame. The fast OSI indication represents interference observed over a certain subband on a particular reverse link frame. The fast OSI indication facilitates determining a transmit delta value. At 610, an interference offset value is broadcasted. An interference offset value is broadcasted for every subband. The value represents amount of interference observed on a particular subband filtered across interlaces. For example, the interference offset value can represent an IoT level of a subband.

Figure 7:
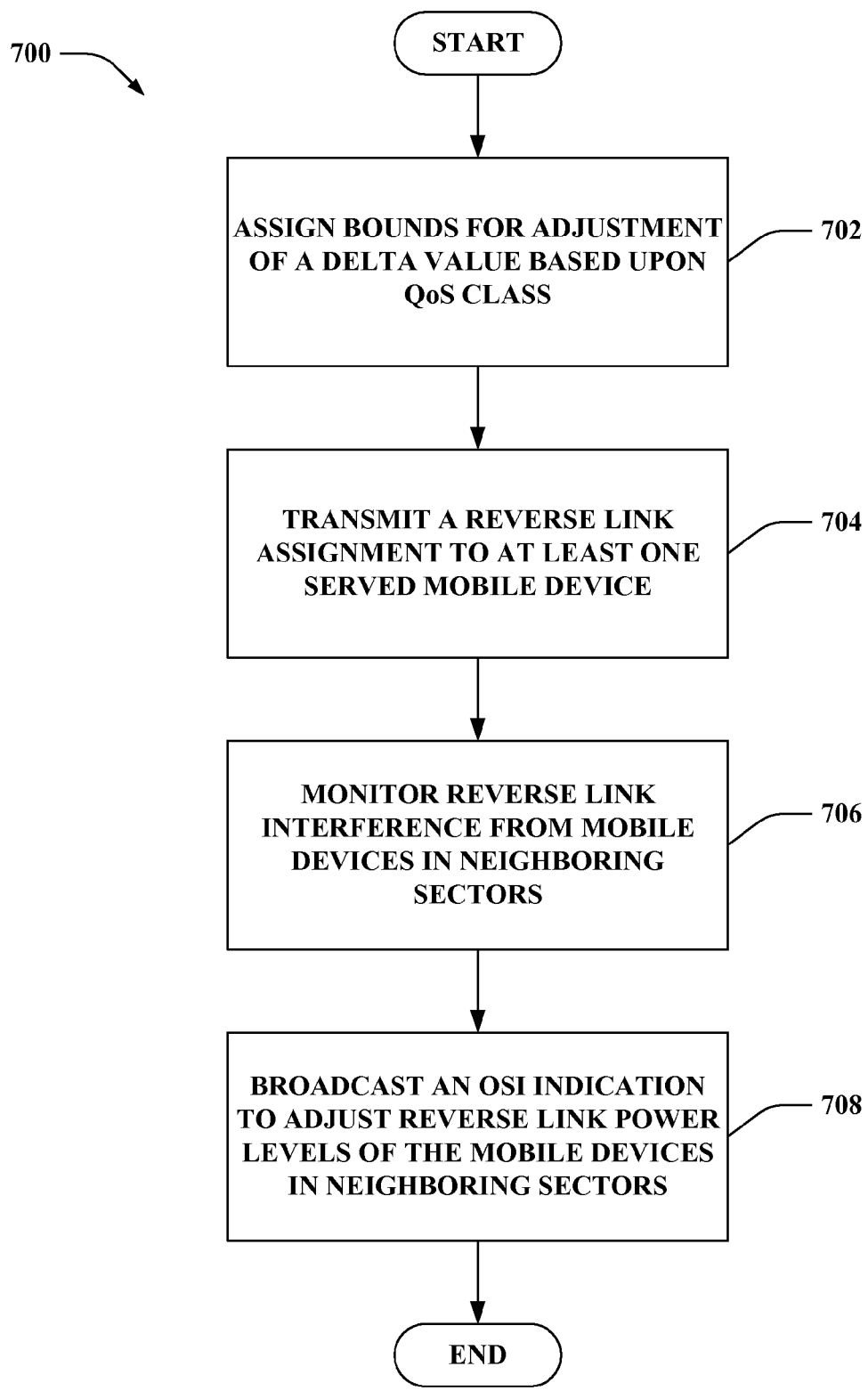
FIG. 7 is an illustration of an example methodology that facilitates controlling reverse link power in a wireless communication environment.

With reference to FIG. 7, illustrated is a methodology 700 that facilitates controlling reverse link power in a wireless communication environment. At 702, bounds for adjustment of a delta value can be assigned based upon a QoS class. For instance, a MaxDeltaReduction value can be assigned per QoS class. Moreover, the MaxDeltaReduction value can be employed along with an assigned DataCtoI value to determine a range of a transmit delta value, $\Delta_{tx}$. Further, the MaxDeltaReduction value can be semi-static. According to an example, the MaxDeltaReduction value corresponding to a lowest QoS class within a packet for mixed flows can be utilized. At 704, a reverse link assignment can be transmitted to at least one served mobile device. The assignment can include, for instance, an assigned DataCtoI value. The assigned DataCtoI value can be selected based on a target HARQ termination. Moreover, the assignment can include a reserved value to instruct the at least one served mobile device to employ a current delta value on an assignment interlace. At 706, reverse link interference from mobile devices in neighboring sectors can be monitored. At 708, an OSI indication can be broadcasted to adjust reverse link power levels of the mobile devices in neighboring sectors.

Moreover, feedback can be obtained from served mobile devices in-band and/or out-of-band. The feedback can be leveraged in connection with effectuating assignment decisions. For instance, the feedback can relate to $\Delta_{tx}$, $\Delta_{slow}$, PA headroom, projected $P_{max}$, chandiff, and so forth. In-band feedback can be included in MAC header fields, for example. Moreover, out-of-band feedback can be obtained via dedicated physical layer channels (e.g., R-PAHCH, R-PSDCH, . . . ).

Further, a determination can be effectuated to extend HARQ transmission. Upon recognizing that a packet may not be decoded within an initially allocated number of HARQ retransmissions, a message can be sent to a served mobile device that extends the number of HARQ retransmissions to mitigate packet loss. Additionally or alternatively, a boost profile can be assigned to a mobile device; the boost profile can be employed by the mobile device to increase reverse link transmit PSD associated with later HARQ retransmissions in a series to enhance an ability to decode a packet.

Figure 8:
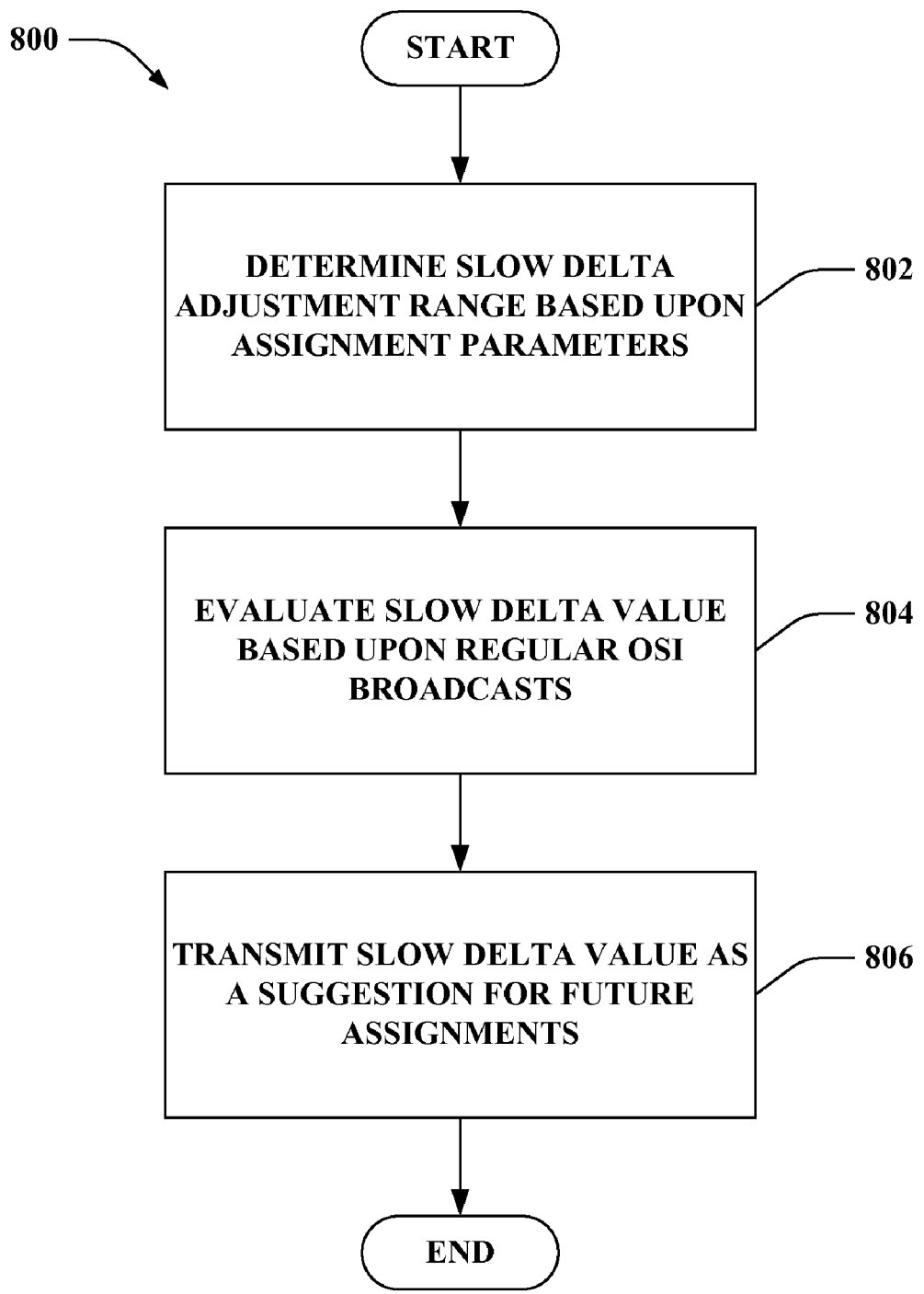
FIG. 8 is an illustration of an example methodology that effectuates reverse link power control in wireless communication.

Turning to FIG. 8, illustrated is a methodology 800 that effectuates reverse link power control in wireless communication. Method 800 can be employed by a mobile device to, among other things, generate a slow delta value utilized by a base station for future assignment decisions. At 802, a range for a slow delta value is determined. The range can be based upon parameters included in an assignment. For example, a range can be computed based upon considerations of the minimum and maximum CoT values included in the assignment as well as a PSD of a pilot channel. The range defines minimum and maximum values for a slow delta value such that adjustments to the slow delta value are constrained within the range. These values can also be included in a previous assignment and not the most current. For example, certain parameters can be semi-static and only require periodic updating. At 804, a slow delta value is evaluated or adjusted. The value is evaluated based upon regular OSI broadcasts from members of a monitor set. In addition, chandiff values corresponding to the monitor set members as well as a current slow delta value can be considered. At 806, the adjusted slow delta value is transmitted. The value can be communicated to a base station serving a reverse link of a mobile device to be employed in future assignment decisions.

Figure 9:
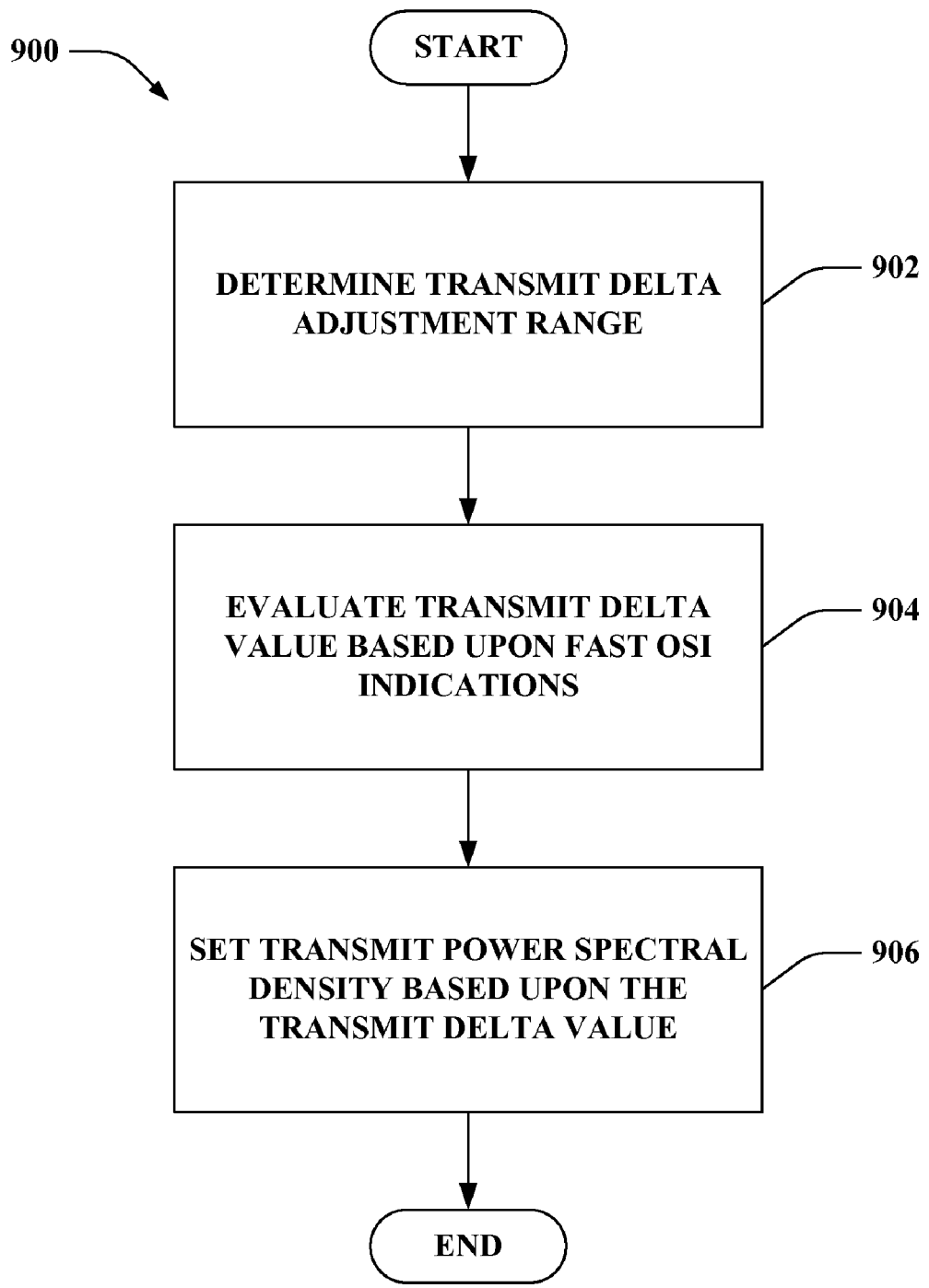
FIG. 9 is an illustration of an example methodology that effectuates reverse link power adjustment.

With reference to FIG. 9, illustrated is a methodology 900 that effectuates reverse link power adjustment. Method 900 can be employed by a mobile device in a wireless communications system to set a PSD for a reverse link traffic channel. At 902, a range for a transmit delta value is established. The range can be based upon values included in an assignment. In addition, the range can be determined based upon considerations of interference offset values as well as a CoT value of a pilot channel. At 904, a transmit delta value is evaluated or adjusted. The adjustment can be based on fast OSI indications broadcasted. For example, the transmit delta value can be initialized to a maximum value and then adjusted up or down by an assigned step size depending on the fast OSI indications. An indication of increased interference in other sectors typically results in a step down of the transmit delta value while no indications can result in a step up of transmit delta value. At 906, a power spectral density of a reverse link traffic channel is set. The PSD is established based upon the transmit delta value. For example, in accordance with an aspect of the subject disclosure, the traffic channel PSD is set to the sum of a PSD of a pilot channel and the transmit delta value. In addition, assigned boost values can be included in the sum.

Figure 10:
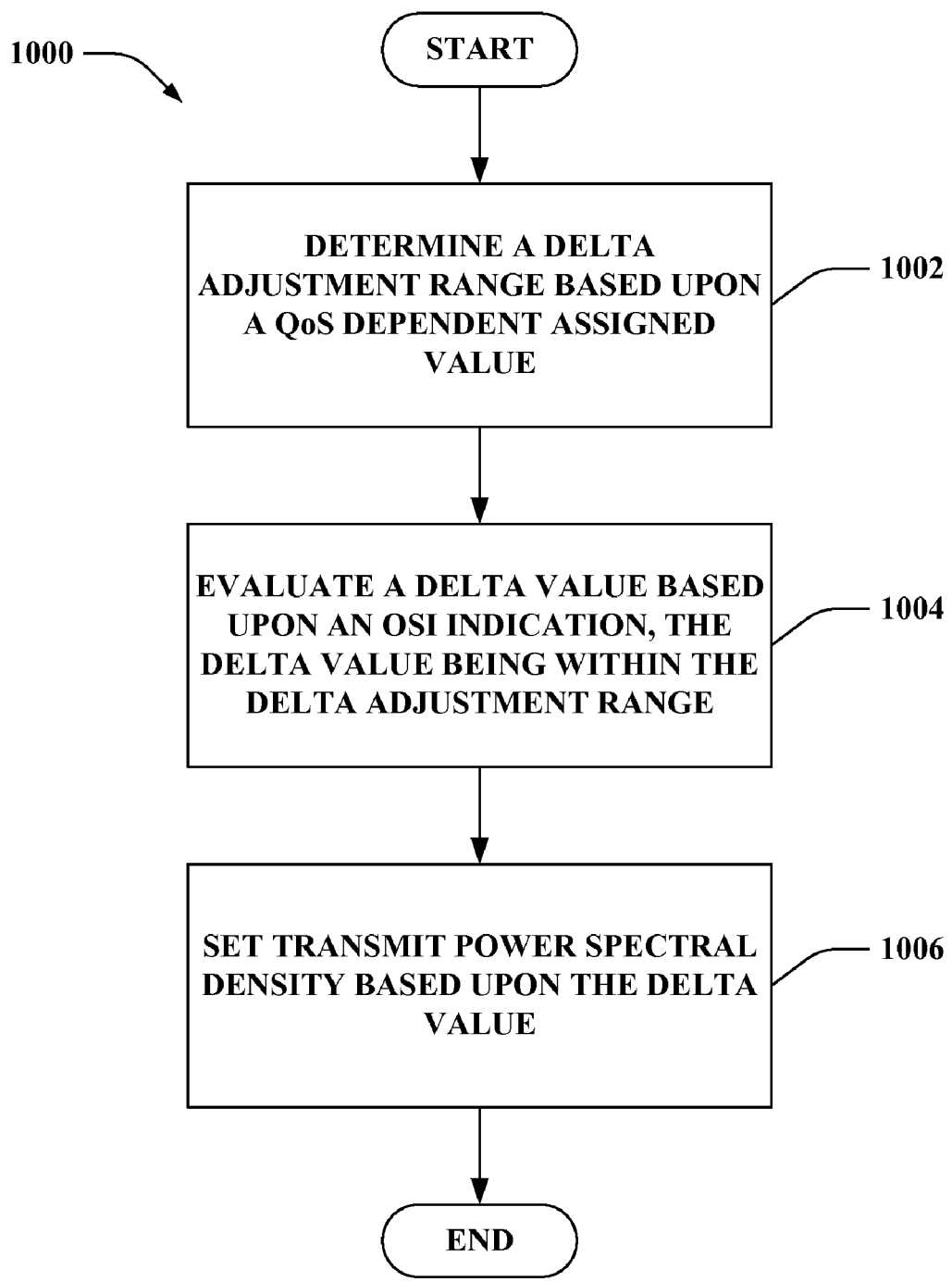
FIG. 10 is an illustration of an example methodology that facilitates controlling reverse link power levels in a wireless communication environment.

Turning to FIG. 10, illustrated is a methodology 1000 that facilitates controlling reverse link power levels in a wireless communication environment. At 1002, a delta adjustment range can be determined based upon a QoS dependent assigned value. The QoS dependent assigned value can be, for instance, a MaxDeltaReduction value that can be allocated per QoS class. Further, the MaxDeltaReduction value to be utilized can be selected based upon a lowest QoS class within a packet (e.g., where the packet can include a plurality of disparate QoS classes). Moreover, the delta adjustment range can be a range of transmit delta values, $\Delta_{tx}$. At 1004, a delta value can be evaluated based upon an OSI indication, where the delta value can be within the delta adjustment range. At 1006, transmit power spectral density can be set based upon the delta value. The transmit PSD can be employed for reverse link transmission.

According to another illustration, HARQ retransmissions can be utilized. For instance, a message can be received that increases a number of HARQ retransmissions to employ, and thus, the number of HARQ retransmissions can thereby be increased. Pursuant to another illustration, the transmit PSD can be increased based upon a number of retransmissions previously effectuated for a given packet. Moreover, for example, a current delta value can be used on an interlace and/or subzone based upon a reserved value included in an assignment (e.g., obtained from a base station).

It will be appreciated that, in accordance with one or more aspects described herein, inferences can be made regarding assigning mobile devices, generating OSI monitor sets, determining chandiff values, evaluating slow delta values, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to assigning mobile devices based upon considerations of slow delta values transmitted to a base station by the mobile devices. By way of further illustration, an inference can be made related to determining adjustments to a slow delta value based upon regular OSI indications, chandiff values and a current delta value. It will be appreciated that the foregoing examples are illustrative in nature and are not intended to limit the number of inferences that can be made or the manner in which such inferences are made in conjunction with the various embodiments and/or methods described herein.

Figure 11:
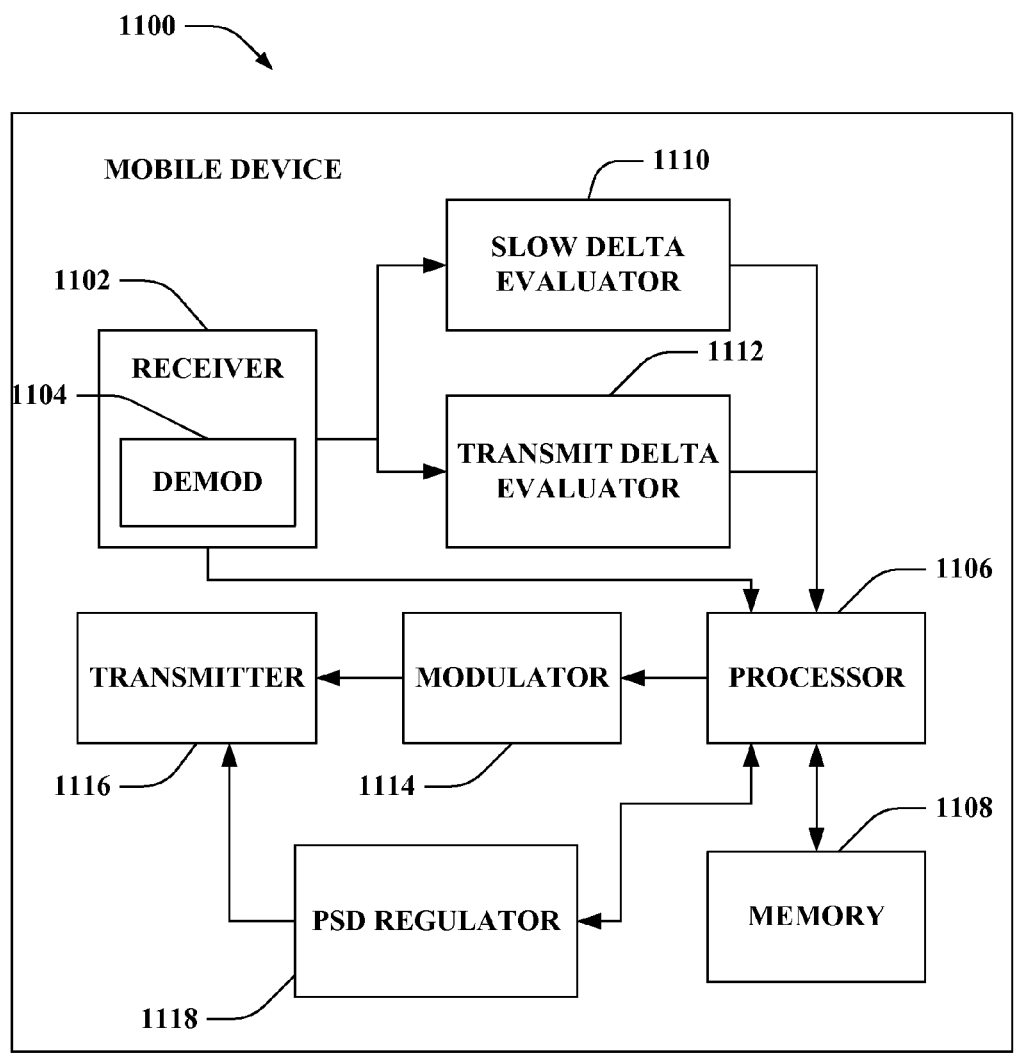
FIG. 11 is an illustration of an example mobile device that facilitates reverse link transmit power control.

FIG. 11 is an illustration of a mobile device 1100 that facilitates adjusting reverse link power based upon considerations of broadcasted interference information. Mobile device 1100 comprises a receiver 1102 that receives a signal from, for instance, a receive antenna (not shown), and performs typical actions thereon (e.g., filters, amplifies, downconverts, etc.) the received signal and digitizes the conditioned signal to obtain samples. Receiver 1102 can be, for example, an MMSE receiver, and can comprise a demodulator 1104 that can demodulate received symbols and provide them to a processor 1106 for channel estimation. Processor 1106 can be a processor dedicated to analyzing information received by receiver 1102 and/or generating information for transmission by a transmitter 1116, a processor that controls one or more components of mobile device 1100, and/or a processor that both analyzes information received by receiver 1102, generates information for transmission by transmitter 1116, and controls one or more components of mobile device 1100.

Mobile device 1100 can additionally comprise memory 1108 that is operatively coupled to processor 1106 and that can store data to be transmitted, received data, information related to available channels, data associated with analyzed signal and/or interference strength, information related to an assigned channel, power, rate, or the like, and any other suitable information for estimating a channel and communicating via the channel. Memory 1108 can additionally store protocols and/or algorithms associated with estimating and/or utilizing a channel (e.g., performance based, capacity based, etc.).

It will be appreciated that the data store (e.g., memory 1108) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1108 of the subject systems and methods is intended to comprise, without being limited to, these and any other suitable types of memory.

Receiver 1102 is further operatively coupled to a slow delta evaluator 1110 that determines a slow delta value for mobile device 1100. Slow delta evaluator 1110 maintains and adjusts the slow delta value based upon considerations of regular OSI indications that are broadcasted by base stations and received at mobile device 1100 by receiver 1102. Slow evaluator 1110 establishes an OSI monitor set by applying a threshold value to forward link geometries of sector that mobile device 1100 can acquire other than a reverse link serving sector. Chandiff values are computed for each member of the set. The slow delta value is adjusted based upon the OSI monitor set, chandiff values and/or regular OSI indications. Additionally, the slow delta value can be transmitted by mobile device 1100 to provide a suggested value for future assignments by a reverse link serving base station. Additionally, receiver 1102 is coupled to a transmit delta evaluator 1112 that determines a transmit delta value for mobile device 1100. Transmit delta evaluator 1112 maintains and adjusts the transmit delta value based upon considerations of fast OSI indications broadcasted by base stations and received at mobile device 1100 by receiver 1102. Transmit delta evaluator 1112, after initializing the transmit delta value to a maximum, steps up or steps down the transmit delta value based upon the fast OSI indications. Mobile device 1100 can transmit the adjusted value to a serving base station as feedback.

Mobile device 1100 still further comprises a modulator 1114 and transmitter 1116 that transmits a signal (e.g., power limitation indicators) to, for instance, a base station, another mobile device, etc. A PSD regulator 1118 is coupled to processor 1106 and transmitter 1116. PSD regulator established the power spectral density of a reverse link traffic channel assigned to mobile device 1100 based in part on the transmit delta value maintained and adjusted by transmit delta evaluator 1112 and a PSD of a pilot channel. Although depicted as being separate from the processor 1106, it is to be appreciated that slow delta evaluator 1110, transmit delta evaluator 1112, PSD regulator 1118 and/or modulator 1114 can be part of processor 1106 or a number of processors (not shown).

Figure 12:
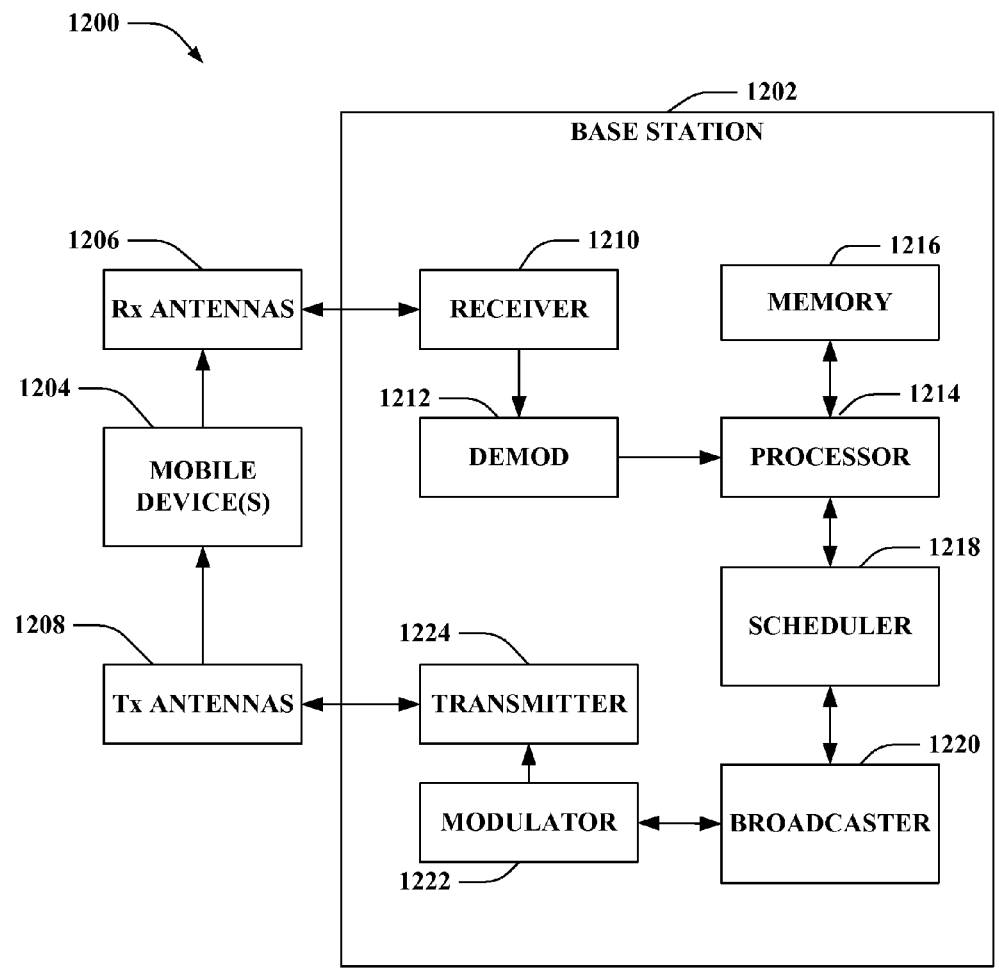
FIG. 12 is an illustration of an example system that facilitates reverse link power control by providing power control related information.

FIG. 12 is an illustration of a system 1200 that facilitates reverse link power control through providing power control related information to mobile devices in a wireless communications system. System 1200 comprises a base station 1202 (e.g., access point, . . . ) with a receiver 1210 that receives signal(s) from one or more mobile devices 904 through a plurality of receive antennas 1206, and a transmitter 1220 that transmits to the one or more mobile devices 1204 through a transmit antenna 1208. Receiver 1210 can receive information from receive antennas 1206 and is operatively associated with a demodulator 1212 that demodulates received information. Demodulated symbols are analyzed by a processor 1214 that can be similar to the processor described above with regard to FIG. 11, and which is coupled to a memory 1216 that stores information related to estimating a signal (e.g., pilot) strength and/or interference strength, data to be transmitted to or received from mobile device(s) 1204 (or a disparate base station (not shown)), and/or any other suitable information related to performing the various actions and functions set forth herein.

Processor 1214 is further coupled to a scheduler 1218 that assigns mobile device 1204 to reverse link traffic channels. Scheduler 1218 makes an assignment decision based up considerations of buffer size, QoS level and feedback information. Feedback information can include delta values (e.g., transmit delta value and slow delta value) received from mobile devices 1204. In addition, feedback information can include power amplifier headroom and indications of excessive fast OSI activity. Scheduler 1218 includes power control related information in the assignment. For example, scheduler 1218 can include target C/I values, minimum and maximum CoT values, step sizes, etc. While these aforementioned parameters are assigned by base station 1202, it is to be appreciated that the parameters need not be assigned through the same mechanisms or at the same time. For example, step sizes and minimum/maximum CoT values can be semi-static parameters that need not be assigned for each packet or assignment. These parameters can be updated through upper layer messages or the like whenever an update is needed. These values can be utilized by mobile devices 1204 in power control decisions.

Processor 1214 is further coupled to a broadcaster 1220. Broadcaster 1220 broadcasts information to mobile devices 1204. The information is relevant to power control decisions to be made by mobile devices 1204. For example, broadcasted information can include regular OSI indications broadcasted every superframe wherein the regular OSI indications represent average interference observed during the previous one or more superframes. Broadcaster 1220 can further broadcast fast OSI indications corresponding to every subband. These indications represent interference observed over the subbands. In addition, broadcaster 1220 can broadcast interference offset values that are based upon amount of interference observed on each subband filtered across interlaces. Modulator 1222 can multiplex the control information for transmission by a transmitter 1224 through antenna 1208 to mobile device(s) 1204. Mobile devices 1204 can be similar to mobile device 1100 described with reference to FIG. 11 and employ broadcasted information to adjust transmit power. It should be appreciated that other functions can be utilized in accordance with the subject disclosure. Although depicted as being separate from the processor 1214, it is to be appreciated that scheduler 1218, broadcaster 1220 and/or modulator 1222 can be part of processor 1214 or a number of processors (not shown).

Figure 13:
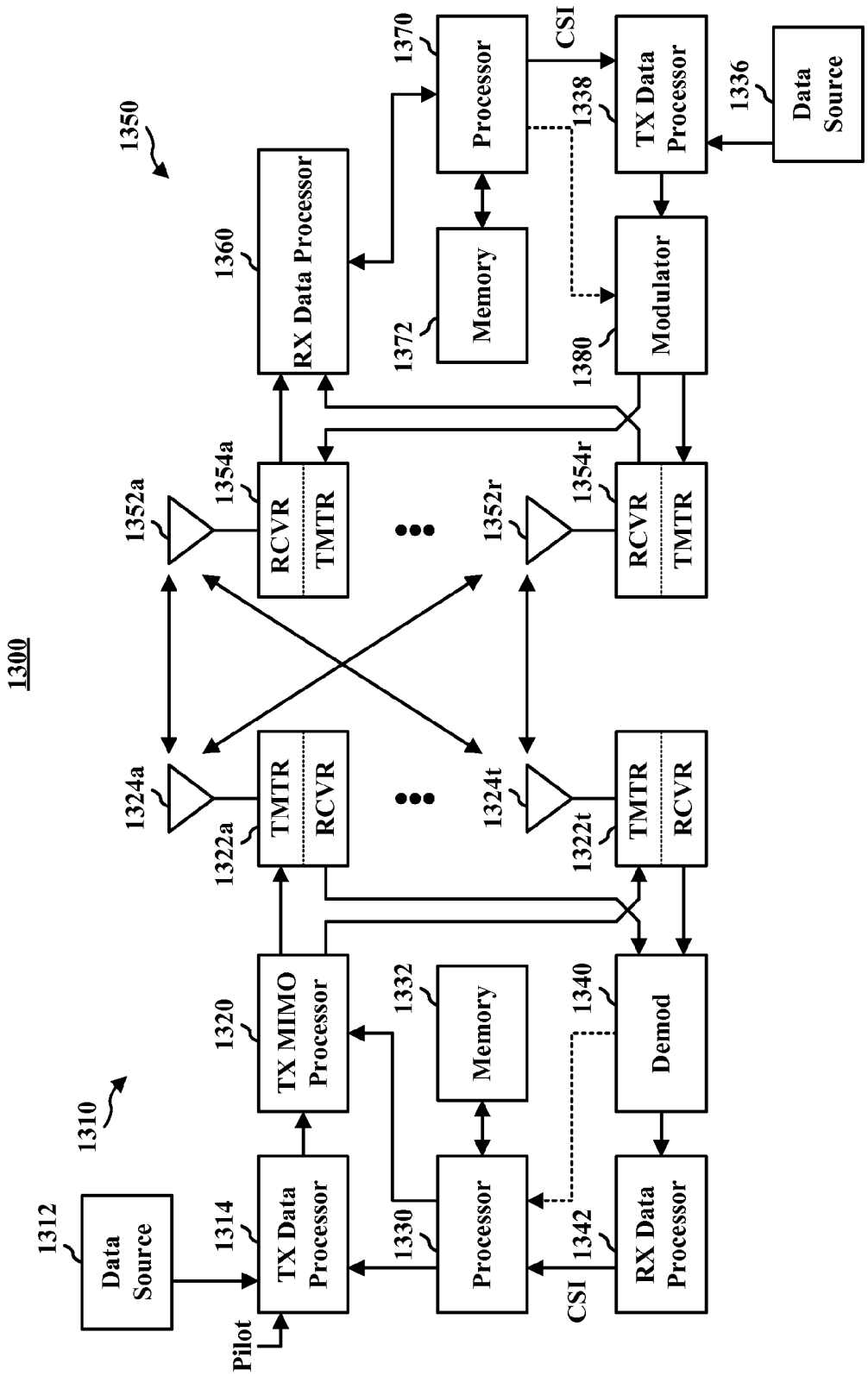
FIG. 13 is an illustration of an example wireless network environment that can be employed in conjunction with the various systems and methods described herein.

FIG. 13 shows an example wireless communication system 1300. The wireless communication system 1300 depicts one base station 1310 and one mobile device 1350 for sake of brevity. However, it is to be appreciated that system 1300 can include more than one base station and/or more than one mobile device, wherein additional base stations and/or mobile devices can be substantially similar or different from example base station 1310 and mobile device 1350 described below. In addition, it is to be appreciated that base station 1310 and/or mobile device 1350 can employ the systems (FIGS. 1-3, 5 and 11-12) and/or methods (FIGS. 6-10) described herein to facilitate wireless communication there between.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides $N_T$ modulation symbol streams to $N_T$ transceivers (TMTR/RCVR) 1322a through 1322t. In various embodiments, TX MIMO processor 1320 applies beamforming weights to the symbols of the data streams and to the antenna from which the symbol is being transmitted.

Each transceiver 1322 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transceiver 1322a through 1322t are transmitted from $N_T$ antennas 1324a through 1324t, respectively.

At mobile device 1350, the transmitted modulated signals are received by $N_R$ antennas 1352a through 1352r and the received signal from each antenna 1352 is provided to a respective transceiver (TMTR/RCVR) 1354a through 1354r. Each transceiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the $N_R$ received symbol streams from $N_R$ transceivers 1354 based on a particular receiver processing technique to provide $N_T$ "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which preceding matrix to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transceivers 1354a through 1354r, and transmitted back to base station 1310.

At base station 1310, the modulated signals from mobile device 1350 are received by antennas 1324, conditioned by transceivers 1322, demodulated by a demodulator 1340, and processed by a RX data processor 1342 to extract the reverse link message transmitted by mobile device 1350. Further, processor 1330 can process the extracted message to determine which preceding matrix to use for determining the beamforming weights.

Processors 1330 and 1370 can direct (e.g., control, coordinate, manage, etc.) operation at base station 1310 and mobile device 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

It is to be understood that the embodiments described herein can be implemented in hardware, software, firmware, middleware, microcode, or any combination thereof For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 14:
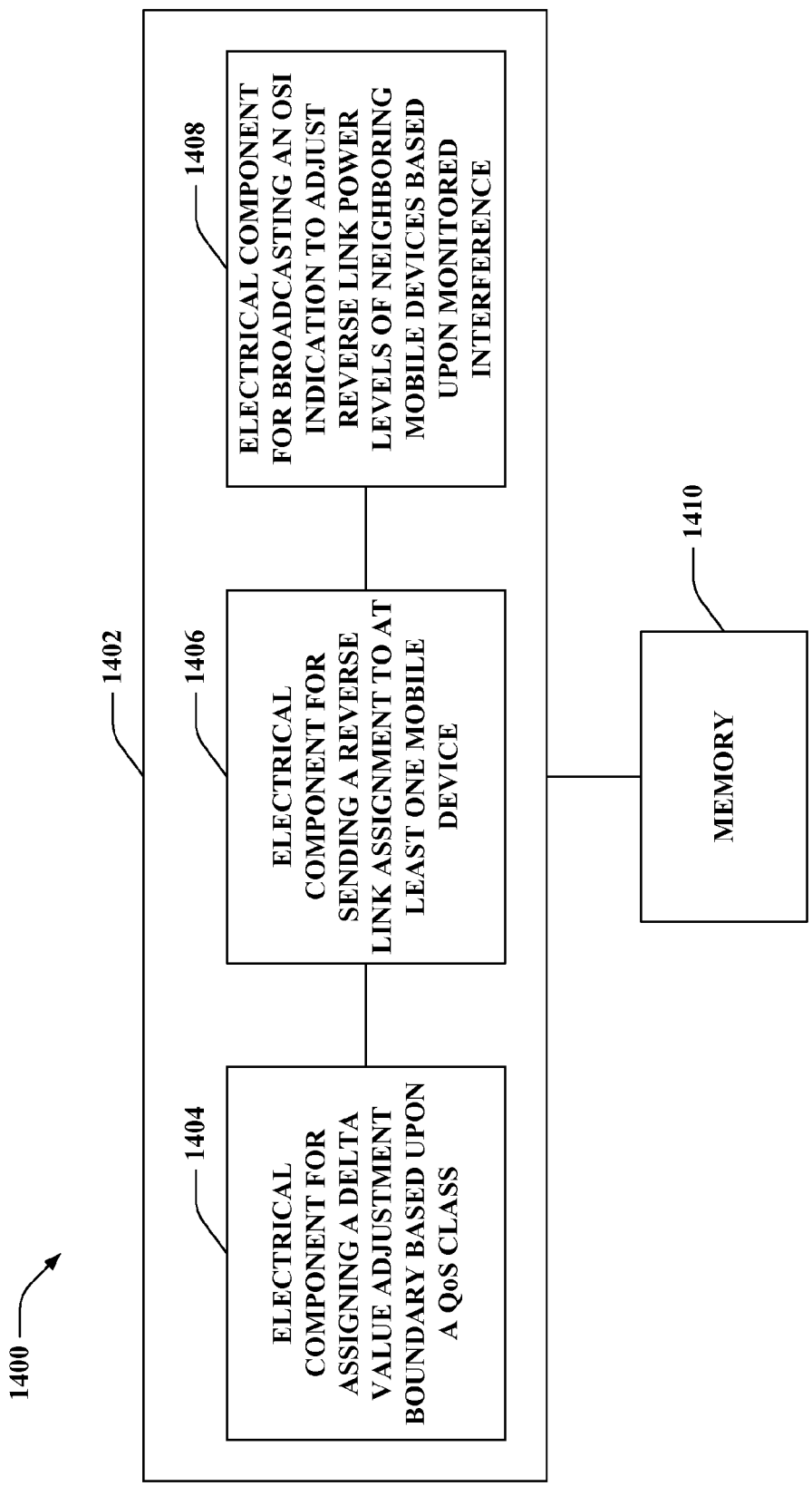
FIG. 14 is an illustration of an example system that enables controlling reverse link interference levels of mobile devices in a wireless communication environment.

With reference to FIG. 14, illustrated is a system 1400 that enables controlling reverse link interference levels of mobile devices in a wireless communication environment. For example, system 1400 can reside at least partially within a base station. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for assigning a delta value adjustment boundary based upon a QoS class 1404. Further, logical grouping 1402 can comprise an electrical component for sending a reverse link assignment to at least one mobile device 1406. Moreover, logical grouping 1402 can include an electrical component for broadcasting an OSI indication to adjust reverse link power levels of neighboring mobile devices based upon monitored interference 1408. For instance, the OSI indication can be a regular OSI indication and/or a fast OSI indication. According to an example, OSI indications can include regular OSI indications that enable slow delta value evaluations. Slow delta values can be employed as suggested values for mobile device assignments. In addition, OSI indications can include fast OSI indications that provide indications of interference for transmission on a subband. Fast OSI indication enable adjusting transmit delta values. Additionally, system 1400 can include a memory 1410 that retains instructions for executing functions associated with electrical components 1404, 1406, and 1408. While shown as being external to memory 1410, it is to be understood that one or more of electrical components 1404, 1406, and 1408 can exist within memory 1410.

Figure 15:
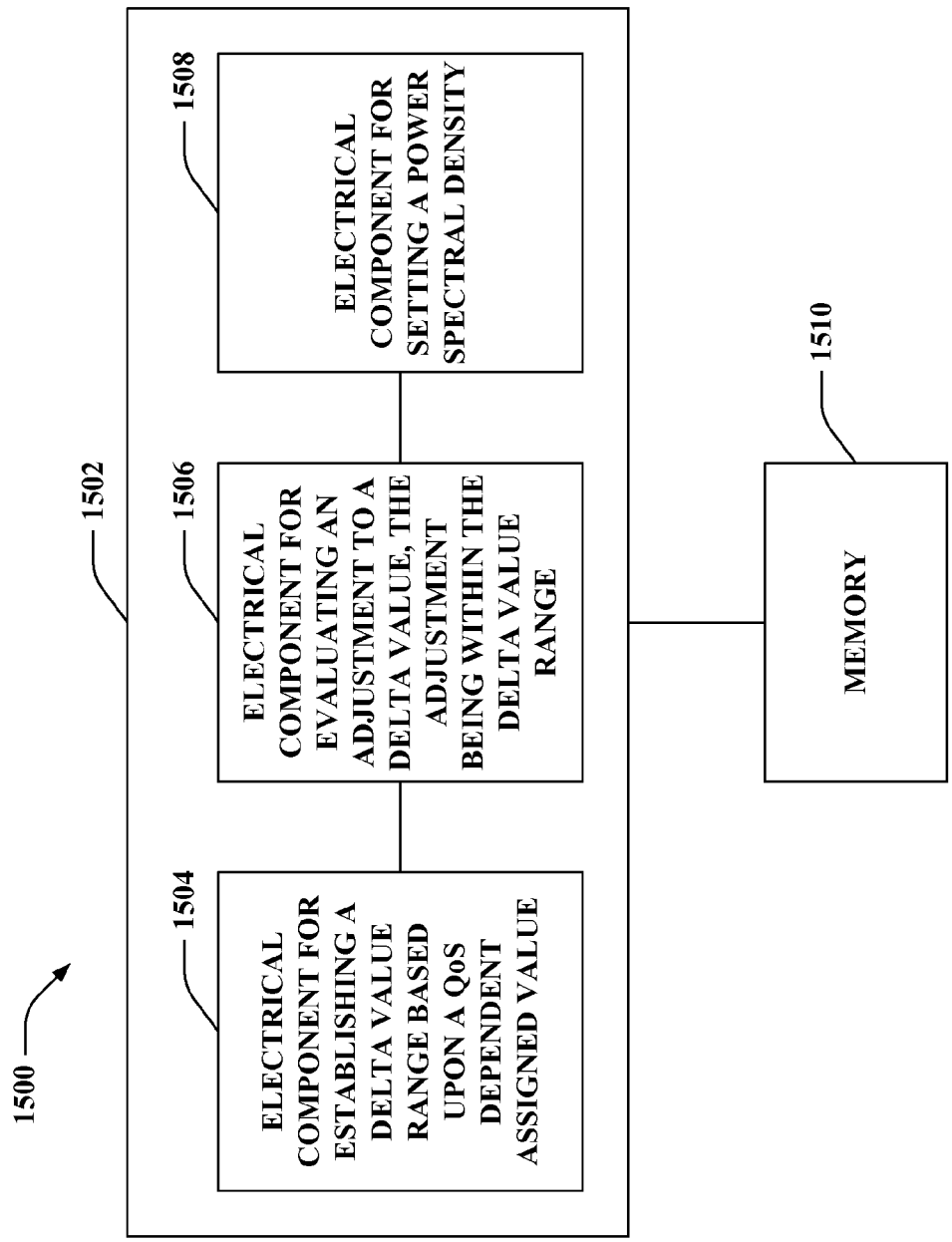
FIG. 15 is an illustration of an example system that enables adjusting a power level employed for communicating via a reverse link in a wireless communication environment.

Turning to FIG. 15, illustrated is a system 1500 that enables adjusting a power level employed for communicating via a reverse link in a wireless communication environment. System 1500 can reside within a mobile device, for instance. As depicted, system 1500 includes functional blocks that can represent functions implemented by a processor, software, or combination thereof (e.g., firmware). System 1500 includes a logical grouping 1502 of electrical components that facilitate controlling reverse link transmission. Logical grouping 1502 can include an electrical component for establishing a delta value range based upon a QoS dependent assigned value 1504. For example, the QoS dependent assigned value can be a MaxDeltaReduction value assigned per QoS class. Moreover, logical grouping 1502 can include an electrical component for evaluating an adjustment to a delta value, the adjustment being within the delta value range 1506. For example, the adjustment can be based upon received OSI indications. Further, logical grouping 1502 can comprise an electrical component for setting a power spectral density 1508. For example, after evaluating an adjustment to a transmit delta value, the PSD of the reverse link traffic channel can be set based upon the new delta value, among other things. Additionally, system 1500 can include a memory 1510 that retains instructions for executing functions associated with electrical components 1504, 1506, and 1508. While shown as being external to memory 1510, it is to be understood that electrical components 1504, 1506, and 1508 can exist within memory 1510.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates controlling reverse link power in a wireless communication environment, comprising:
    generating, with a wireless communications apparatus that serves a sector in which at least one served mobile device resides, a reverse link assignment assigning bounds for adjustment of a delta value based upon a quality of service (QoS) class to the at least one served mobile device, wherein the QoS class defines performance requirements for delivery of communications between the at least one served mobile device and the wireless communications apparatus;
    transmitting, with the wireless communications apparatus, the reverse link assignment to the at least one served mobile device;
    monitoring, with the wireless communications apparatus, reverse link interference from mobile devices in neighboring sectors; and
    based on the monitored reverse link interference from the mobile devices in neighboring sectors, broadcasting an other sector interference (OSI) indication with the wireless communications apparatus to adjust reverse link power levels of the mobile devices in neighboring sectors.

2. The method of claim 1, wherein the bounds for adjustment of the delta value comprises a MaxDeltaReduction value assigned per the QoS class.

3. The method of claim 2, wherein the MaxDeltaReduction value is employed with an assigned DataCtoI value to determine a range of a transmit delta value.

4. The method of claim 2, wherein the MaxDeltaReduction value is semi-static.

5. The method of claim 2,
    wherein the QoS class is one of a plurality of QoS classes, and
    wherein the MaxDeltaReduction value corresponds to a lowest QoS class within a packet for mixed flows associated with the plurality of QoS classes.

6. The method of claim 1, wherein the reverse link assignment includes an assigned DataCtoI value selected based on a target hybrid automatic repeat request (HARQ) termination.

7. The method of claim 1, further comprising:
    recognizing a lack of decoding of a packet within an initially allocated number of hybrid automatic repeat request (HARQ) retransmissions; and
    sending a message to a particular served mobile device that extends the number of HARQ retransmissions to mitigate packet loss.

8. The method of claim 1, further comprising assigning a boost profile employed by a particular served mobile device to increase reverse link transmit power spectral density (PSD) associated with later hybrid automatic repeat request (HARQ) retransmissions in a series.

9. The method of claim 1, wherein the reverse link assignment includes a reserved value to instruct the at least one served mobile device to employ a current delta value on an assignment interlace.

10. The method of claim 1, further comprising receiving feedback from the at least one served mobile device communicated one or more of in-band or out-of-band.

11. The method of claim 1, wherein the performance requirements comprise a latency requirement.

12. A wireless communications apparatus, comprising:
    a memory that retains instructions related to generating a reverse link assignment assigning bounds for adjustment of a delta value based upon a quality of service (QoS) class to a served mobile device, wherein the QoS class defines performance requirements for delivery of communications between the mobile device and the wireless communications apparatus, transmitting the reverse link assignment to the served mobile device, monitoring reverse link interference from mobile devices in neighboring sectors, and based on the monitored reverse link interference from the mobile devices in neighboring sectors, broadcasting an other sector interference (OSI) indication to alter reverse link power levels of the mobile devices in neighboring sectors; and a processor, coupled to the memory, configured to execute the instructions retained in the memory.

13. The wireless communications apparatus of claim 12, wherein the bounds for adjustment of the delta value comprise a MaxDeltaReduction value assigned per the QoS class, the MaxDeltaReduction value provides a maximum amount that the served mobile device is permitted to reduce an associated delta value in response to obtained OSI indications from neighboring sectors.

14. The wireless communications apparatus of claim 13, wherein the MaxDeltaReduction value is utilized with an assigned DataCtoI value included in the assignment to identify a range of a transmit delta value.

15. The wireless communications apparatus of claim 13, wherein the QoS class is one of a plurality of QoS classes, and wherein the MaxDeltaReduction value relates to a lowest QoS class within a packet associated with the plurality of QoS classes.

16. The wireless communications apparatus of claim 12, wherein the memory further retains instructions for recognizing a lack of decoding a packet from the served mobile device within an initially allocated number of hybrid automatic repeat request (HARQ) retransmissions and transmitting a signal to the served mobile device to increase the number of HARQ retransmissions.

17. The wireless communications apparatus of claim 12, wherein the memory further retains instructions for allocating a boost profile employed by the served mobile device to increase reverse link transmit power spectral density (PSD) associated with later hybrid automatic repeat request (HARQ) retransmissions in a sequence.

18. The wireless communications apparatus of claim 12, wherein the memory further retains instructions for obtaining at least one of in-band or out-of-band feedback from the served mobile device.

19. The wireless communications apparatus of claim 12, wherein the reverse link assignment includes a reserved value to instruct the served mobile device to employ a current delta value on an assignment interlace.

20. A wireless communications apparatus that enables controlling reverse link interference levels of mobile devices in a wireless communications environment, comprising:

means for generating a reverse link assignment assigning a delta value adjustment boundary based upon a QoS class to at least one served mobile device, wherein the QoS class defines performance requirements for delivery of communications between the at least one served mobile device and the wireless communications apparatus;

means for transmitting the reverse link assignment to the at least one served mobile device;

means for monitoring reverse link interference from mobile devices in neighboring sectors; and means for broadcasting, based on the monitored reverse link interference from the mobile devices in neighboring sectors, an OSI indication to adjust reverse link power levels of neighboring mobile devices.

21. The wireless communications apparatus of claim 20, wherein the delta value adjustment boundary comprises a MaxDeltaReduction value assigned per the QoS class that provides a maximum amount of allowable reduction for an associated delta value in response to obtained OSI indications from neighboring sectors.

22. The wireless communications apparatus of claim 21, wherein the MaxDeltaReduction value corresponds to a lowest QoS class within a packet associated with a plurality of QoS classes.

23. The wireless communications apparatus of claim 20, further comprising means for extending a number of hybrid automatic repeat request (HARQ) transmissions.

24. The wireless communications apparatus of claim 20, further comprising means for assigning a boost profile to be employed by the at least one mobile device to increase reverse link power spectral density (PSD) associated with later hybrid automatic repeat request (HARQ) retransmissions.

25. The wireless communications apparatus of claim 20, further comprising means for receiving at least one of in-band or out-of-band feedback from the at least one mobile device.

26. The wireless communications apparatus of claim 20, wherein the reverse link assignment includes a reserved value to instruct the at least one mobile device to utilize a current delta value on an assignment interlace.

27. A non-transitory machine-readable medium comprising instructions that, when executed, cause one or more processor to:

generate a reverse link assignment assigning a delta value adjustment boundary based upon a QoS class to at least one served mobile device, wherein the QoS class defines performance requirements for delivery of communications from the at least one served mobile device;

transmit the reverse link assignment to the at least one served mobile device;

monitor reverse link interference from mobile devices in neighboring sectors, and based on the monitored reverse link interference from the mobile devices in neighboring sectors, broadcast an OSI indication to adjust reverse link power levels of neighboring mobile devices based upon monitored interference.

28. The non-transitory machine-readable medium of claim 27, wherein the delta value adjust boundary comprises a MaxDeltaReduction value assigned per the QoS class that provides a maximum amount of allowable reduction for an associated transmit delta value in response to received OSI indications from neighboring sectors.

29. The non-transitory machine-readable medium of claim 28, wherein the MaxDeltaReduction value corresponds to a lowest QoS class within a packet associated with a plurality of QoS classes.

30. The non-transitory machine-readable medium of claim 27, further comprising instructions that, when executed, cause the one or more processors to extend a number of hybrid automatic repeat request (HARQ) transmissions.

31. The non-transitory machine-readable medium of claim 27, further comprising instructions that, when executed, cause the one or more processors to assign a boost profile to be employed by the at least one mobile device to increase reverse link power spectral density (PSD) associated with later hybrid automatic repeat request (HARQ) retransmissions.

32. The non-transitory machine-readable medium of claim 27, further comprising instructions that, when executed, cause the one or more processors to receive at least one of in-band or out-of-band feedback from the at least one mobile device.

33. The non-transitory machine-readable medium of claim 27, wherein the reverse link assignment includes a reserved value to instruct the at least one mobile device to utilize a current delta value on an assignment interlace.

34. In a wireless communications system, an apparatus comprising:
a processor configured to:
grant a reverse link assignment assigning bounds for adjustment of a delta value based upon a quality of service (QoS) class to at least one served mobile device, wherein the QoS class defines performance requirements for delivery of communications between the at least one served mobile device and the apparatus;
transmit the reverse link assignment to the at least one served mobile device;
monitor reverse link interference from mobile devices in neighboring sectors; and
based on the monitored reverse link interference from the mobile devices in the neighboring sectors, broadcast an other sector interference (OSI) indication to adjust reverse link power levels of the mobile devices in neighboring sectors.

35. A method that facilitates controlling reverse link power levels in a wireless communications environment, comprising:
determining, with a mobile device, a delta adjustment range based upon an assigned value allocated per a quality of service (QoS) class, wherein the QoS class defines performance requirements for delivery of communications to and from the mobile device;
evaluating, with the mobile device, a delta value based upon an other sector interference (OSI) indication, the delta value being within the delta adjustment range; and
setting, with the mobile device, a transmit power spectral density (PSD) based upon the delta value.

36. The method of claim 35, wherein the assigned value comprises a MaxDeltaReduction value allocated per the QoS class.

37. The method of claim 36, wherein the QoS class is one of a plurality of QoS classes, and the method further comprising further comprising selecting the MaxDeltaReduction value based upon a lowest QoS class within a packet associated with the plurality of QoS classes.

38. The method of claim 35, wherein the delta adjustment range comprises a range of transmit delta values.

39. The method of claim 35, further comprising receiving a message that increases a number of hybrid automatic repeat request (HARQ) retransmissions to be employed.

40. The method of claim 35, further comprising increasing the transmit PSD based upon a number of hybrid automatic repeat request (HARQ) retransmissions previously effectuated for a given packet.

41. The method of claim 35, further comprising sending at least one of in-band or out-of-band feedback to a serving sector.

42. The method of claim 35, further comprising employing a reserved value included in an assignment to use a current delta value on a corresponding interlace and subzone.

43. The method of claim 35, wherein the performance requirements comprise a latency requirement.

44. A wireless communications apparatus, comprising:
a memory that retains instructions related to determining a delta adjustment range based upon an assigned value allocated per a quality of service (QoS) class, wherein the QoS class defines performance requirements for delivery of communications to and from the wireless communications apparatus, evaluating a delta value based upon an other sector interference (OSI) indication, the delta value being within the delta adjustment range, and setting a transmit power spectral density (PSD) based upon the delta value; and
a processor, coupled to the memory, configured to execute the instructions retained in the memory.

45. The wireless communications apparatus of claim 44, wherein the assigned value comprises a MaxDeltaReduction value allocated per the QoS class that provides a maximum amount of allowable reduction for an associated transmit delta value in response to received OSI indications from neighboring sectors.

46. The wireless communications apparatus of claim 45, wherein the QoS class is one of a plurality of QoS classes, and wherein the memory further retains instructions for determining the MaxDeltaReduction value to employ based upon a lowest QoS class included in a packet associated with the plurality of QoS classes.

47. The wireless communications apparatus of claim 44, wherein the memory further retains instructions related to extending a number of hybrid automatic repeat request (HARQ) transmissions based upon a received message.

48. The wireless communications apparatus of claim 44, wherein the memory further retains instructions related to increasing the transmit PSD based upon a number of hybrid automatic repeat request (HARQ) retransmissions previously effectuated for a given packet.

49. The wireless communications apparatus of claim 44, wherein the memory further retains instructions related to transmitting at least one of in-band feedback or out-of-band feedback to a serving sector.

50. The wireless communications apparatus of claim 44, wherein the memory further retains instructions related to utilizing a current delta value on an interlace and subzone based upon a reserved value included in an assignment.

51. A wireless communications apparatus that enables adjusting a power level employed for communicating via a reverse link in a wireless communications environment, comprising:
means for determining a delta value range based upon an assigned value allocated per quality of service (QoS) class, wherein the QoS class defines performance requirements for delivery of communications to and from the wireless communications apparatus;
means for evaluating an adjustment to a delta value, the adjustment being within the delta value range; and
means for setting a power spectral density based upon the delta value.

52. The wireless communications apparatus of claim 51, wherein the assigned value comprises a MaxDeltaReduction value assigned per the QoS class, the MaxDeltaReduction value provides a maximum amount of allowable reduction for an associated transmit delta value in response to received OSI indications from neighboring sectors.

53. The wireless communications apparatus of claim 52, further comprising means for determining the MaxDeltaReduction value to utilize based upon a lowest QoS class within a packet associated with a plurality of QoS classes.

54. The wireless communications apparatus of claim 51, further comprising means for extending a number of hybrid automatic repeat request (HARQ) transmissions based upon a received message.

55. The wireless communications apparatus of claim 51, further comprising means for increasing the power spectral density based upon a number of hybrid automatic repeat request (HARQ) retransmissions previously effectuated for a given packet.

56. The wireless communications apparatus of claim 51, further comprising means for transmitting feedback at least one of in-band or out-of-band to a serving sector.

57. The wireless communications apparatus of claim 51, further comprising means for utilizing a current delta value on an interlace and subzone based upon a reserved value included in an assignment.

58. A non-transitory machine-readable medium comprising instructions that, when executed, cause one or more processors of a wireless communications apparatus to:
 determine a delta value range based upon an assigned value allocated per quality of service (QoS) class, wherein the QoS class defines performance requirements for delivery of communications to and from the wireless communications apparatus;
 evaluate an adjustment to a delta value, the adjustment being within the delta value range; and
 set a power spectral density for reverse link transmission based upon the delta value.

59. The non-transitory machine-readable medium of claim 58, wherein the assigned value comprises a MaxDeltaReduction value assigned per the QoS class, the MaxDeltaReduction value provides a maximum amount of allowable reduction for an associated transmit delta value in response to received OSI indications from neighboring sectors.

60. The non-transitory machine-readable medium of claim 59, further comprising instructions that, when executed cause the one or more processors to select the MaxDeltaReduction value to utilize based upon a lowest QoS class included within a packet associated with a plurality of QoS classes.

61. The non-transitory machine-readable medium of claim 58, further comprising instructions that, when executed, cause the one or more processors to increase a number of hybrid automatic repeat request (HARQ) transmissions based upon a received message.

62. The non-transitory machine-readable medium of claim 58, further comprising instructions that, when executed, cause the one or more processors to increase the power spectral density based upon a number of hybrid automatic repeat request (HARQ) retransmissions previously effectuated for a given packet.

63. The non-transitory machine-readable medium of claim 58, further comprising instructions that, when executed, cause the one or more processors to transmit feedback one or more of in-band or out-of-band to a serving sector.

64. The non-transitory machine-readable medium of claim 58, further comprising instructions that, when executed, cause the one or more processors to employ a reserved value included in an assignment to use a current delta value on a particular interlace and subzone.

65. In a wireless communications system, an apparatus comprising:
 a processor configured to:
  determine a delta adjustment range based upon an assigned value allocated per quality of service (QoS) class, wherein the QoS class defines performance requirements for delivery of communications to and from the apparatus;
  evaluate a delta value based upon an other sector interference (OSI) indication, the delta value being within the delta adjustment range; and
  set a transmit power spectral density (PSD) based upon the delta value.

* * * * *